United States Patent
Shimokuni et al.

(10) Patent No.: US 9,634,930 B2
(45) Date of Patent: Apr. 25, 2017

(54) METHOD OF CONTROLLING VIRTUAL ROUTER, COMPUTER-READABLE RECORDING MEDIUM, AND CONTROL DEVICE

(71) Applicant: FUJITSU LIMITED, Kawasaki-shi, Kanagawa (JP)

(72) Inventors: Osamu Shimokuni, Kawasaki (JP); Kazuhiro Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 290 days.

(21) Appl. No.: 14/336,272

(22) Filed: Jul. 21, 2014

(65) Prior Publication Data

US 2015/0043379 A1 Feb. 12, 2015

(30) Foreign Application Priority Data

Aug. 9, 2013 (JP) .................................. 2013-166861

(51) Int. Cl.
*H04L 12/713* (2013.01)
*G06F 9/455* (2006.01)
*H04L 12/46* (2006.01)

(52) U.S. Cl.
CPC ........ *H04L 45/586* (2013.01); *G06F 9/45558* (2013.01); *G06F 2009/45595* (2013.01); *H04L 12/4633* (2013.01)

(58) Field of Classification Search
CPC combination set(s) only.
See application file for complete search history.

(56) References Cited

U.S. PATENT DOCUMENTS 6,970,902 B1 * 11/2005 Moon .................... H04L 45/56
709/201
8,429,647 B2 * 4/2013 Zhou .................... G06F 9/4856
709/220

(Continued)

FOREIGN PATENT DOCUMENTS

JP 2012-231382 11/2012

OTHER PUBLICATIONS

Extended European Search report dated Feb. 12, 2015 in European Patent Application No. 14178159.1-1857.

(Continued)

*Primary Examiner* — Mounir Moutaouakil
(74) *Attorney, Agent, or Firm* — Staas & Halsey LLP

(57) ABSTRACT

A method of controlling a virtual router includes: starting first and second virtual routers where a same address is set, on first and second networks; constructing, with respect to a plurality of virtual machines arranged in plural networks, a first virtual network that establishes coupling between first one or more virtual machines and coupling between the first one or more virtual machines and the first virtual router, and establishes coupling between second one or more virtual machines and coupling between the second one or more virtual machines and the second virtual router, the first one or more virtual machines being arranged on the first network, the second one or more virtual machines being arranged on the second network; constructing a second virtual network that establishes coupling between the first virtual router and the second virtual router; and creating and setting routing tables corresponding to the first and second virtual routers.

8 Claims, 31 Drawing Sheets

(56) References Cited

U.S. PATENT DOCUMENTS

| | | | | |
|---|---|---|---|---|
| 2007/0180436 A1* | 8/2007 | Travostino | ............ | G06F 9/4856 717/138 |
| 2007/0280243 A1* | 12/2007 | Wray | ................. | H04L 12/4633 370/392 |
| 2009/0034416 A1* | 2/2009 | Baron | ................. | H04L 12/4633 370/235 |
| 2009/0119087 A1* | 5/2009 | Ang | .................... | G06F 9/45558 703/23 |
| 2009/0327392 A1* | 12/2009 | Tripathi | .................. | G06F 15/16 709/201 |
| 2010/0107162 A1* | 4/2010 | Edwards | ............... | G06F 9/5077 718/1 |
| 2010/0287548 A1 | 11/2010 | Zhou et al. | | |
| 2011/0019676 A1 | 1/2011 | Portolani et al. | | |

OTHER PUBLICATIONS

Ezra Silvera et al., "IP Mobility to Support Live Migration of Virtual Machines Across Subnets", Systor'09: May 4, 2009-Apr. 6, 2009, pp. 1-10, XP058026545.

Kim-Khoa Nguyen et al., "Powering a Data Center Network via Renewable Energy: A Green Testbed", IEEE Internet Computing, IEEE Service Center, New York, NY. Institute of Electrical and Electronics Engineers, US, vol. 17, No. , Jan. 1, 2013, pp. 40-49, XP011488854.

Office Action of Japanese Patent Application No. 2013-166861 dated Feb. 28, 2017.

Yukio Nagafuchi et al., "Proposal of a routing control method to avoid redundant routes in the live migration environment between datacenters", IEICE Technical Report vol. 113 No. 140, The Institute of Electronics, Information and Communication Engineers, Jul. 11, 2013.

* cited by examiner

FIG. 8
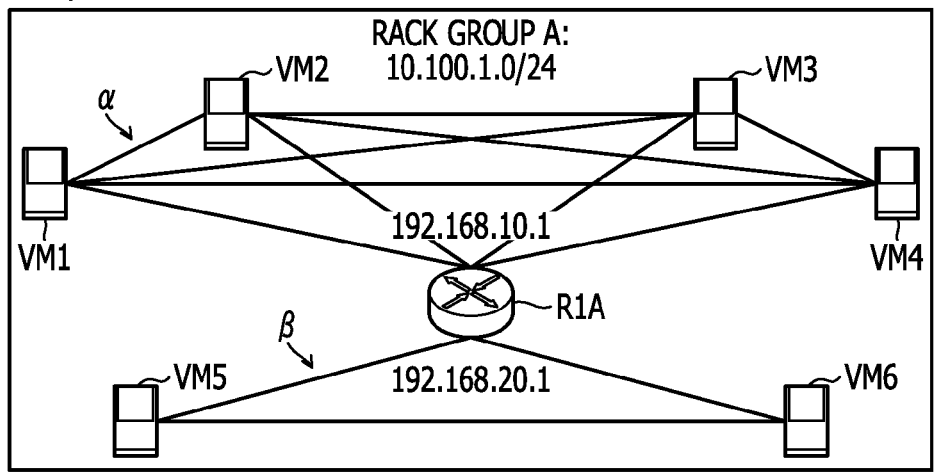
(STATE 0)
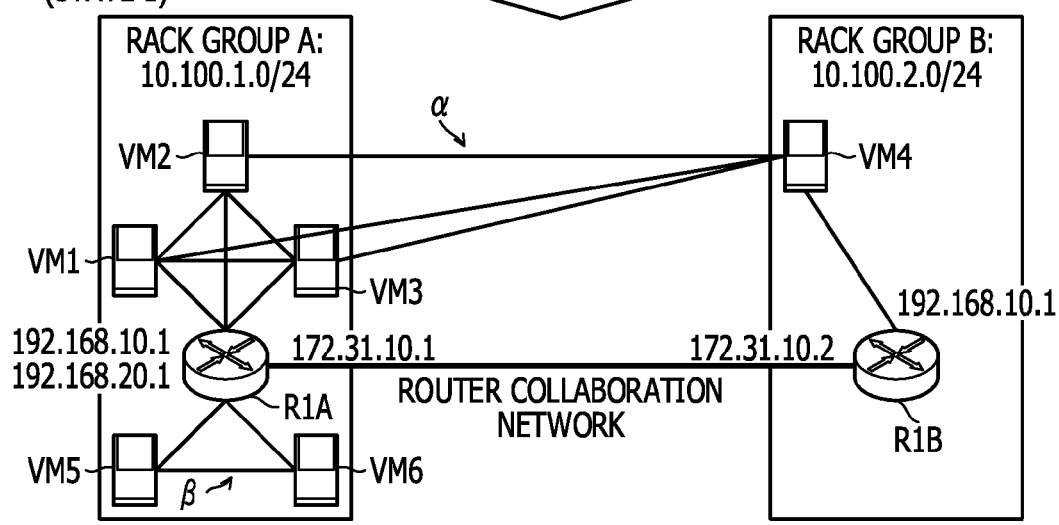
(STATE 1)

FIG. 9

500 — VIRTUAL SYSTEM INFORMATION / PHYSICAL SYSTEM INFORMATION

| VM NAME | COUPLED VIRTUAL NETWORK | VIRTUAL NETWORK IP ADDRESS | RACK GROUP NAME | PHYSICAL NETWORK IP ADDRESS |
|---|---|---|---|---|
| VM1 | α | 192.168.10.11 | A | 10.100.1.67 |
| VM2 | α | 192.168.10.12 | A | 10.100.1.94 |
| VM3 | α | 192.168.10.13 | A | 10.100.1.63 |
| VM4 | α | 192.168.10.14 | B | 10.100.2.72 |
| VM5 | β | 192.168.20.11 | A | 10.100.1.23 |
| VM6 | β | 192.168.20.12 | A | 10.100.1.42 |

501–506

600 — LOGICAL ROUTER R1

610

| COUPLED VIRTUAL NETWORK | VIRTUAL NETWORK IP ADDRESS |
|---|---|
| α | 192.168.10.1 |
| β | 192.168.20.1 |

611, 612

620

| INSTANCE NAME | RACK GROUP NAME | ROUTER COLLABORATION NETWORK IP ADDRESS | PHYSICAL NETWORK IP ADDRESS |
|---|---|---|---|
| R1A | A | 172.31.10.1 | 10.100.1.35 |
| R1B | B | 172.31.10.2 | 10.100.2.22 |

PHYSICAL SYSTEM INFORMATION

| VM NAME | VIRTUAL SYSTEM INFORMATION | | PHYSICAL SYSTEM INFORMATION | |
|---|---|---|---|---|
| | COUPLED VIRTUAL NETWORK | VIRTUAL NETWORK IP ADDRESS | RACK GROUP NAME | PHYSICAL NETWORK IP ADDRESS |
| VM1 | α | 192.168.10.11 | A | 10.100.1.67 |
| VM2 | α | 192.168.10.12 | A | 10.100.1.94 |
| VM3 | α | 192.168.10.13 | B | 10.100.2.87 |
| VM4 | α | 192.168.10.14 | B | 10.100.2.72 |
| VM5 | β | 192.168.20.11 | A | 10.100.1.23 |
| VM6 | β | 192.168.20.12 | B | 10.100.2.38 |

501, 502, 503, 504, 505, 506

600

| COUPLED VIRTUAL NETWORK | VIRTUAL NETWORK IP ADDRESS |
|---|---|
| α | 192.168.10.1 |
| β | 192.168.20.1 |

610

611, 612

620

| INSTANCE NAME | RACK GROUP NAME | ROUTER COLLABORATION NETWORK IP ADDRESS | PHYSICAL NETWORK IP ADDRESS |
|---|---|---|---|
| R1A | A | 172.31.10.1 | 10.100.1.35 |
| R1B | B | 172.31.10.2 | 10.100.2.22 |

LOGICAL ROUTER R1

621, 622

METHOD OF CONTROLLING VIRTUAL ROUTER, COMPUTER-READABLE RECORDING MEDIUM, AND CONTROL DEVICE

CROSS-REFERENCE TO RELATED APPLICATION

This application is based upon and claims the benefit of priority from the prior Japanese Patent Application No. 2013-166861, filed on Aug. 9, 2013, the entire contents of which are incorporated herein by reference.

FIELD

The present embodiments discussed herein are related to a method of controlling a virtual router, a computer-readable recording medium, and a control device.

BACKGROUND

Infrastructure as a Service (IaaS) is a service for providing, to a user, a platform itself desired for the operation of a computer system. The IaaS is based on the assumption of providing a system that includes a virtual machine designed by a user and a network and causing the system to be freely used by the user.

In addition, in a data center for providing the IaaS to a plurality of users, in order to easily provide and manage systems for the respective users, the systems of the users are constructed and managed in units of rack groups. The term, "rack group", means a set of physical machines integrated in order to put a resource configuration into units, perform resource management in a distributed processing manner, and isolate failures.

As a technique existing in the related art, there has been known a virtual machine monitor that provides a virtual router IP address for each segment and includes a routing table associating virtual machine IP addresses of virtual machines operating on a plurality of virtual machine monitors and virtual router IP addresses with each other. The virtual machine monitor references the routing table at the time of transmitting a packet, and in a case where a destination virtual router IP address is equal to the self-virtual machine monitor, the virtual machine monitor translates a destination MAC address into the MAC address of a destination virtual machine, and transmits the packet after the translation. On the other hand, in a case where the destination virtual router IP address is not equal to the self-virtual machine, the virtual machine monitor translates the destination MAC address into the MAC address of a destination virtual router, and transmits the packet after the translation.

Japanese Laid-open Patent Publication No. 2012-231382 is known as a related art, for example.

SUMMARY

According to an aspect of the invention, a method of controlling a virtual router, the method includes: starting first and second virtual routers where a same address is set, on first and second networks included in a plurality of networks; constructing, with respect to a plurality of virtual machines arranged in the plural networks, a first virtual network that establishes coupling between first one or more virtual machines out of the plural virtual machines and coupling between the first one or more virtual machines and the first virtual router, and establishes coupling between second one or more virtual machines out of the plural virtual machines and coupling between the second one or more virtual machines and the second virtual router, the first one or more virtual machines being arranged on the first network, the second one or more virtual machines being arranged on the second network; constructing a second virtual network that establishes coupling between the first virtual router and the second virtual router; creating routing tables corresponding to the first and second virtual routers; and setting the routing tables in the first and second virtual routers.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates an example of a state transition of the virtual system S;

FIG. 9 illustrates examples of updates of the virtual machine management table 500 and the virtual router management table 600;

FIG. 13 illustrates examples of updates of the virtual machine management table 500 and the virtual router management table 600;

DESCRIPTION OF EMBODIMENTS

According to a technique of the related art, there is a case where resource reallocation, the maintenance of a physical machine, or the like within a data center makes it difficult to migrate a virtual machine operating on a physical machine to another physical machine.

For example, there is a case where a router to be accessed by a virtual machine is changed in association with migration of the virtual machine operating on a physical machine. In this case, for example, the setting of the router regarding the virtual machine is changed. However, the IaaS is based on the assumption that a user freely uses a system provided to the user, and it is difficult for an administrator to be free to change a setting regarding the virtual machine of the user.

In one aspect, an object of the present disclosure is to provide a virtual router control method, a virtual router control program, and a control device that are each able to easily perform migration of a virtual machine associated with changing of a virtual router serving as a coupling destination.

Hereinafter, embodiments of a virtual router control method, a virtual router control program, and a control device according to the present disclosure will be described in detail with reference to drawings.

(Example of Virtual Router Control Method)

Figure 1:
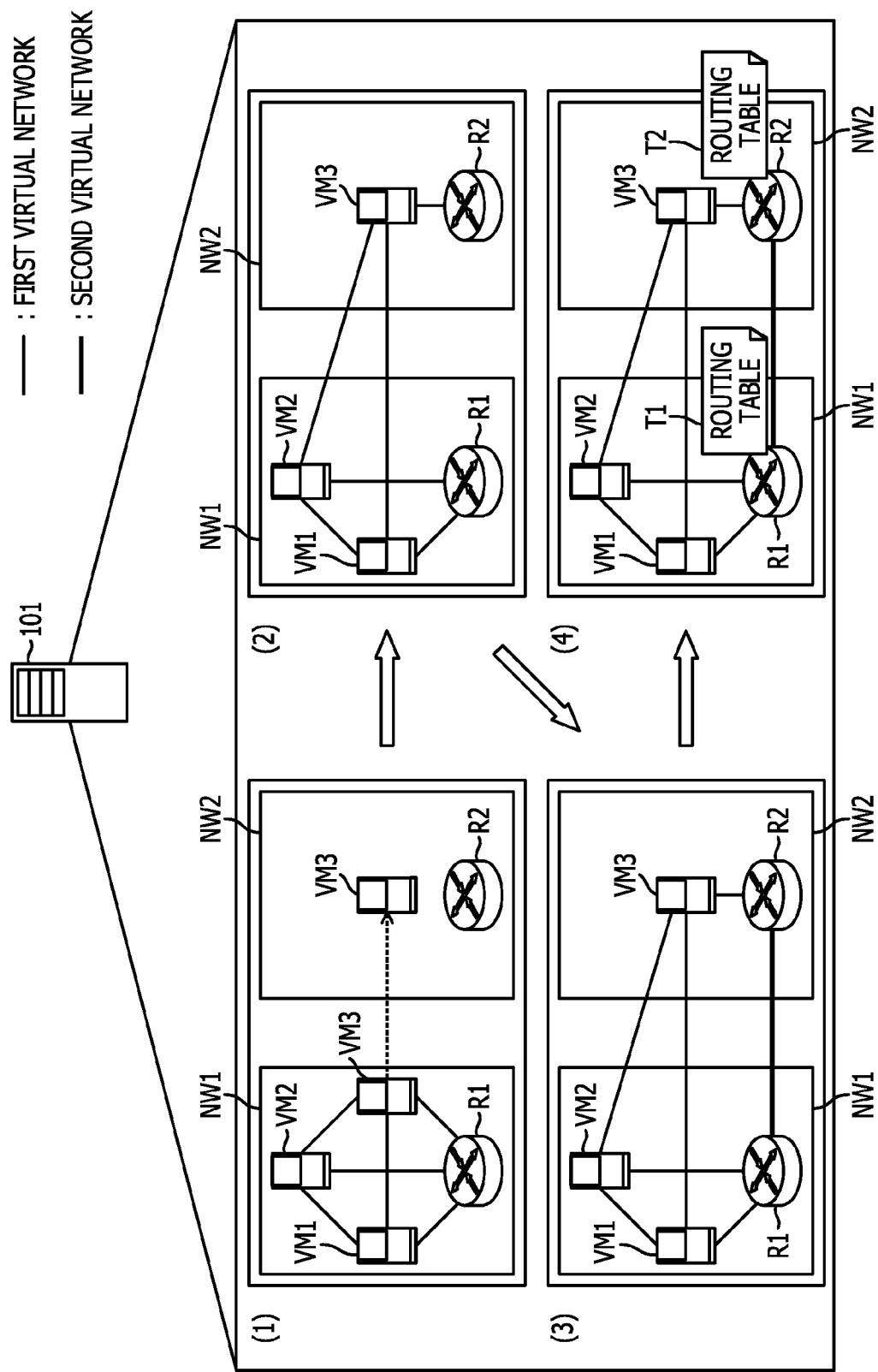
FIG. 1 illustrates an example of a virtual router control method according to an embodiment.

FIG. 1 illustrates an example of a virtual router control method according to an embodiment. In FIG. 1, a control device 101 is a computer that controls a virtual router. Here, the virtual router is a virtual computer having a function of Internet Protocol (IP) routing.

The number of provided virtual routers is able to be increased or decreased based on software, and the provided virtual router may be caused to operate on a dedicated physical machine, and may be caused to operate, as a type of virtual machine, on a general-purpose physical machine. The virtual machine is a virtual computer operating in an execution environment constructed by dividing the hardware resources of a physical computer.

In the present embodiment, based on specified path information, the virtual router performs routing on, for example, packets transmitted and received between virtual machines in a system provided to a user by the IaaS. In the IaaS, the system is designed by the user, and realized by allocating a physical computer, a network, and so forth using modules for managing computer resources.

Here, in a data center for providing the IaaS to a plurality of users, in order to easily provide and manage systems for the respective users, the systems of the users are constructed and managed in units of rack groups. The term, "rack group", means a set of physical machines integrated in order to put a resource configuration into units, perform resource management in a distributed processing manner, and isolate failures. While a physical network is a wire connection closely laid within a rack group, the physical network is a wire connection sparsely laid between rack groups. Therefore, communication has a tendency to be concentrated between rack groups, compared with that within a rack group.

In addition, in the data center, there is a case where, in order to perform resource reallocation, maintenance, or the like, an administrator migrates a virtual machine of a user, which is operating on a physical machine, to another physical machine. In this case, if the virtual machine of the user is migrated beyond a rack group, there occurs a state where a virtual router only exists in one rack group.

In this state, in a case where a failure occurs in the rack group in which the virtual router exists, and communication inability occurs, even if another rack group normally functions, the entire system becomes inoperative, and it becomes difficult to localize the failure. In addition, in this state, it is difficult to localize communication, and rack-group-to-rack-group communication serving a bottleneck occurs.

Therefore, it may be thought that a network is subjected to segment division for each rack group, a virtual router is arranged in each rack group, and routing is performed. However, the user turns out to design the system in consideration of a physical arrangement. In addition, in a case where a virtual machine of the user is migrated beyond a rack group for convenience on an administrator side, such as resource reallocation or maintenance, a router to be accessed by the virtual machine turns out to be changed.

In this case, as for the virtual machine to migrate, the setting of the virtual router or the like is to be changed. However, in the IaaS based on the assumption that the user freely uses the system, it is difficult for the administrator to be free to change a setting regarding the virtual machine. In addition, while there may be considered an operation where every time a virtual machine migrates, the administrator requests the user to redesign the system, adjusts a schedule, and simultaneously implements both the migration of the virtual machine and changing of a setting within the system, the operation is not realistic.

Therefore, in the present embodiment, there will be described a virtual router control method for enabling a virtual machine to migrate beyond a rack group without changing a setting of a virtual machine provided to the user. Hereinafter, an example of control processing in the control device 101 will be described.

(1) At the time of distributedly arranging a virtual machine VM group in a plurality of networks NW, the control device 101 starts virtual routers R where a same address is set within individual networks NW. Here, the term, "network NW", means a communication network constructed by a set of physical servers integrated in order to put a resource configuration into units, perform resource management in a distributed processing manner, and isolate failures.

The network NW is, for example, a local area network (LAN) such as Ethernet (registered trademark). In addition, the network NW may be segment-divided into a plurality of subnets. The virtual machine VM group is a set of virtual machines managed by the user of the IaaS, and is a configuration element that forms the system provided by the IaaS.

In the following description, the system provided by the IaaS is expressed as a "virtual system S" in some cases.

The virtual router R is a configuration element that forms the virtual system S, and performs routing on packets transmitted and received between virtual machines VM within the virtual system S. In addition, the address of the virtual router R means the IP address and the media access control (MAC) address of the virtual router R.

Specifically, for example, at the time of migrating a virtual machine VM from a first network NW to a second network NW among the plural networks NW, the control device 101 starts a first virtual router R in the second network NW. In this regard, however, in a case where a second virtual router R operates in the second network NW, the control device 101 does not start the first virtual router R in the second network NW.

In the example of FIG. 1, virtual machines VM1 to VM3 correspond to the virtual machine VM group that form the virtual system S provided to the user, and are arranged in a network NW1 in an initial state. Here, the virtual machine VM3 out of the virtual machines VM1 to VM3 within the network NW1 is migrated into a network NW2, and a virtual router R2 is started where the same address as that of a virtual router R1 is set within the network NW2.

(2) The control device 101 constructs a first virtual network for coupling the virtual machines VM of the virtual machine VM group to one another and coupling each virtual machine VM and a virtual router R within each network NW to each other. Here, the first virtual network is, for example, a virtual network in a data link layer. The data link layer is located in a second layer (L2: Layer2) in an OSI reference model, and defines a communication method between devices directly coupled on a network.

Specifically, for example, the control device 101 constructs the first virtual network by forming tunnels between virtual machines VM and forming a tunnel between each virtual machine VM and the virtual router R in each network NW. The tunnel is a virtual direct-coupled communication line that is established by tunneling and couples devices to one another.

In the example of FIG. 1, tunnels between virtual machines VM of the virtual machines VM1 to VM3 are formed, a tunnel between each virtual machine VM and the virtual router R within each of the networks NW1 and NW2 is formed, and hence, the first virtual network is constructed. In this regard, however, in the example of FIG. 1, in the initial state, the first virtual network is constructed that couples virtual machines VMs of the virtual machines VM1 to VM3 to one another and couples the virtual machines VM1 to VM3 and the virtual router R1 within the network NW1 to each other.

In this case, by re-forming tunnels between the virtual machine VM3 and the virtual machines VM1 and VM2 and forming a tunnel between the virtual machine VM3 and the virtual router R2 within the network NW2, the control device 101 may reconstruct the first virtual network. In this case, a tunnel formed between the virtual machine VM3 and the virtual router R1 within the network NW1 is deleted (removed).

(3) The control device 101 constructs a second virtual network for coupling the virtual routers R started in the individual networks NW to one another. Here, the second virtual network is, for example, a virtual network in a network layer. The network layer is located in a third layer (L3: Layer3) in the OSI reference model, and defines a communication method for performing communication between networks coupled to one another using a protocol below the data link layer.

Specifically, by forming, for example, tunnels between the virtual routers R, the control device 101 constructs the second virtual network. In the example of FIG. 1, by forming a tunnel between the virtual routers R1 and R2, the second virtual network is constructed.

(4) The control device 101 creates routing tables corresponding to the respective virtual routers R started in the respective networks NW, and sets the routing tables in the respective virtual routers R. Here, the routing tables each mean information storing therein path information relating to the destination of a packet, in other words, a so-called routing table.

Specifically, for example, first, as for the virtual router R started in each network NW, the control device 101 determines whether or not, with respect to each virtual machine VM in the virtual machine VM group, the virtual machine VM is located in the same network NW as the virtual router R. Here, in a case of being located in the same network NW, the control device 101 associates the address of the virtual router R in the first virtual network with the address of the virtual machine VM in the first virtual network.

On the other hand, in a case of not being located in the same network NW, the control device 101 associates, with the address of the virtual machine VM in the first virtual network, the address of another virtual router R in the second virtual network, the other virtual router R being located in the same network NW as the virtual machine VM. From this, it is possible to create a routing table T corresponding to the virtual router R started in each network NW. In the example of FIG. 1, routing tables T1 and T2 corresponding to the virtual routers R1 and R2 are created, and set in the virtual routers R1 and R2, respectively.

In this way, according to the control device 101, at the time of distributedly arranging the virtual machine VM group in the plural networks NW, it is possible to start the virtual routers R where the same address is set in the individual networks NW. In addition, according to the control device 101, it is possible to construct the first virtual network for coupling the individual virtual machines VM to one another and coupling a virtual machine VM and the virtual router R in each network NW to each other, and construct the second virtual network for coupling the virtual routers R started in the individual networks NW to one another. In addition, according to the control device 101, it is possible to create the routing tables T corresponding to the virtual routers R started in the individual networks NW and set the routing tables T in the virtual routers R.

From this, it is possible to easily perform migration of the virtual machine VM associated with changing of the virtual router R serving as a coupling destination, without changing a setting of the virtual machine VM provided to the user. As a result, it becomes possible to migrate the virtual machine VM of the user beyond a rack group for convenience on the administrator side, such as resource reallocation or maintenance of a physical machine within the data center, and it is possible to facilitate resource management or operation management for the data center. In addition, since routing between virtual machines VM within the same network NW is implemented using the virtual router R within the same network NW, it is possible to realize the localization of failures and communication.

(Example of System Configuration of System 200)

Next, an example of the system configuration of a system 200 according to an embodiment will be described. Here, a case where the control device 101 illustrated in FIG. 1 is applied to a module for managing computer resources within the system 200 will be cited as an example and described. In addition, in the following description, in some cases, the above-mentioned "network NW" is expressed as a "rack group rc".

Figure 2:
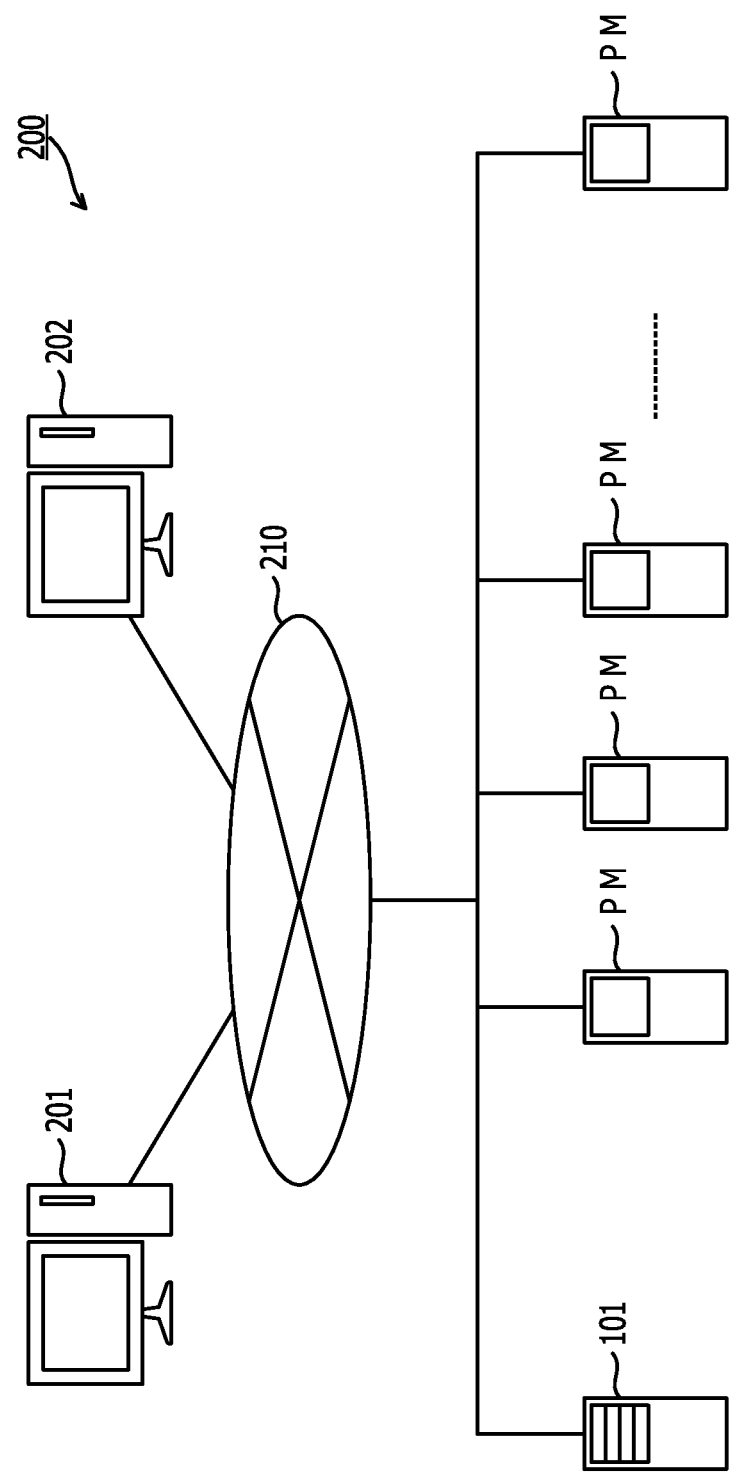
FIG. 2 illustrates an example of a system configuration of a system 200.

FIG. 2 illustrates an example of the system configuration of the system 200. In FIG. 2, the system 200 includes the control device 101, an administrator terminal 201, a user terminal 202, and a plurality of physical machines PM. In the system 200, the control device 101, the administrator terminal 201, the user terminal 202, and the plural physical machines PM are coupled by a wired or wireless network 210. The network 210 is, for example, a local area network (LAN), a wide area network (WAN), the Internet, or the like.

Here, the system 200 is an IaaS system for providing a user with a platform itself desired for the operation of a computer system. The control device 101 has a function for managing computer resources such as physical machines PM, physical networks, and physical storages within the system 200. The administrator terminal 201 is a computer used by an administrator of the system 200. The user terminal 202 is a computer used by the user of the system 200.

Each of the physical machines PM is a computer resource within the system 200, and is a computer that virtualizes hardware resources of the self-device and is capable of executing a plurality of different OSs. The hardware resources of the self-device are, for example, a central processing unit (CPU), a memory, an interface (I/F), and so forth in the physical machine PM.

Specifically, using a virtual machine VM operating in an execution environment constructed by, for example, dividing the hardware resources of the self-device, it is possible for the physical machine PM to cause the OSs to operate. The substance of the virtual machine VM includes, for example, pieces of software such as a program and an OS, variables assigned to pieces of software, and pieces of information for specifying hardware resources used for executing pieces of software. In addition, several tens to several hundreds of the physical machines PM are integrated as a unit and installed in one rack group rc.

In the system 200, by accessing the control device 101 using the administrator terminal 201, it is possible for the administrator to request to change the arrangement of, start, or stop the virtual machines VM operating on the physical machine. In addition, by accessing the control device 101 using the administrator terminal 201, it is possible for the administrator to confirm the deployment state of the virtual machines VM.

In addition, by accessing the control device 101 using the user terminal 202, it is possible for the user to register the design information of the virtual system S. The design information of the virtual system S is information indicating the virtual machines VM that form the virtual system S, the number of the virtual machines VM, a network configuration, and so forth. In addition, by accessing the control device 101 using the user terminal 202, it is possible for the user to request to deploy, change, or pull out the virtual system S.

In response to, for example, a request to deploy the virtual system S, the control device 101 allocates a physical computer, a network, and so forth to the virtual system S. Specifically, based on, for example, the design information of the virtual system S, the control device 101 creates an arrangement plan of, for example, which of the physical machines PM the virtual machines VM for forming the virtual system S are arranged in. In addition, based on the created arrangement plan, the control device 101 starts virtual machines VM or virtual routers R on the physical machines PM or constructs a virtual network for coupling the virtual machines VM or the like on the physical machines PM to one another.

In addition, based on, for example, a request to change the arrangement of, start, or stop the virtual machines VM, the control device 101 controls the migration, the starting, the stopping or the like of the virtual machines VM on the physical machines PM, or controls the starting, the stopping or the like of the virtual routers R on the physical machines PM. In addition, in the system 200, the virtual routers R for forming the virtual system S fall within the scope of responsibilities on the administrator side, and provide transfer services in accordance with a path control specification specified by the user.

(Example of Hardware Configuration of Control Device 101)

Figure 3:
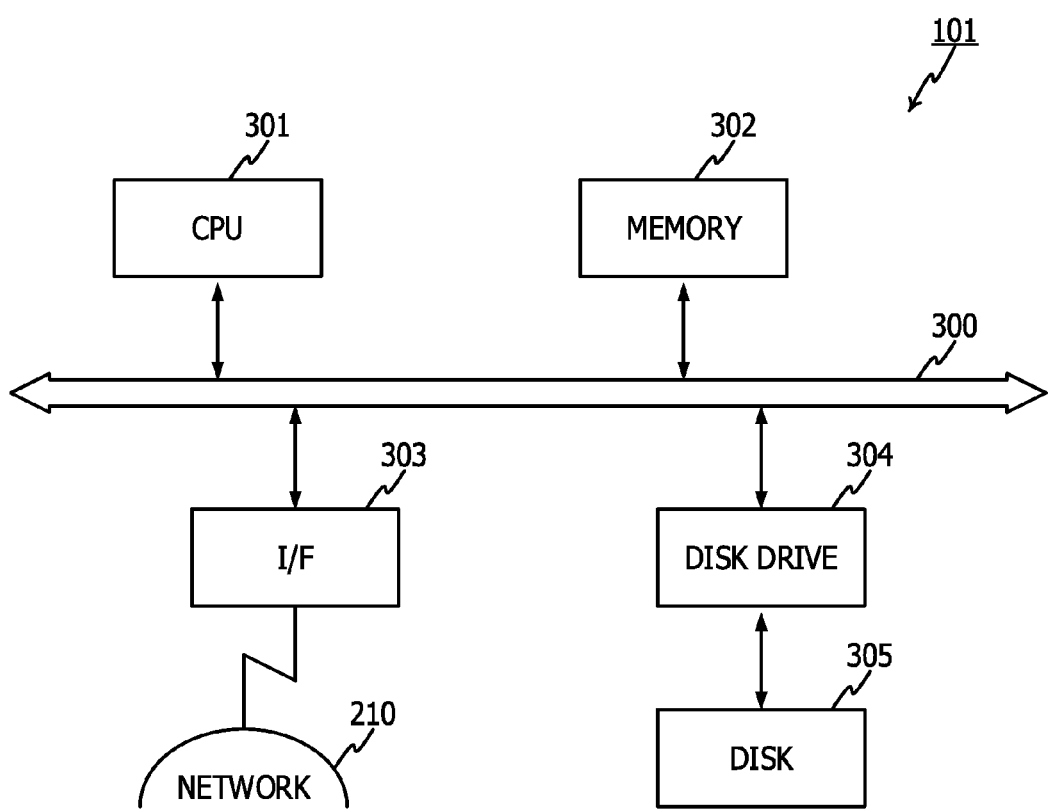
FIG. 3 illustrates an example of a hardware configuration of a control device 101.

FIG. 3 illustrates an example of the hardware configuration of the control device 101. In FIG. 3, the control device 101 includes a CPU 301, a memory 302, an interface (I/F) 303, a disk drive 304, and a disk 305. In addition, the individual configuration units are coupled by a bus 300.

Here, the CPU 301 manages the control of the entire control device 101. The memory 302 includes, for example, a read only memory (ROM), a random access memory (RAM), a flash ROM, and so forth. Specifically, for example, the flash ROM or the ROM stores therein various kinds of programs, and the RAM is used as the work area of the CPU 301. The programs stored in the memory 302 are loaded into the CPU 301, and hence, causes the CPU 301 to execute processing subjected to coding.

The I/F 303 is coupled to the network 210 through a communication line, and coupled to another computer through the network 210. In addition, the I/F 303 manages an interface between the network 210 and the inside, and controls input and output of data from and to the other computer. As the I/F 303, for example, a modem, a LAN adapter, or the like my be adopted.

In accordance with control by the CPU 301, the disk drive 304 controls read and write of data from and to the disk 305. The disk 305 stores therein data written based on control by the disk drive 304. As the disk 305, for example, a magnetic disk, an optical disk, or the like may be cited.

In addition, in addition to the above-mentioned configuration units, the control device 101 may include, for example, a solid state drive (SSD), a keyboard, a mouse, a display, and so forth. In addition, the administrator terminal 201, the user terminal 202, and the physical machines PM illustrated in FIG. 2 may be realized using an example of the same hardware configuration as that of the above-mentioned control device 101.

(Example of System Configuration of Virtual System S)

Next, an example of the system configuration of the virtual system S provided to the user will be described.

Figure 4:
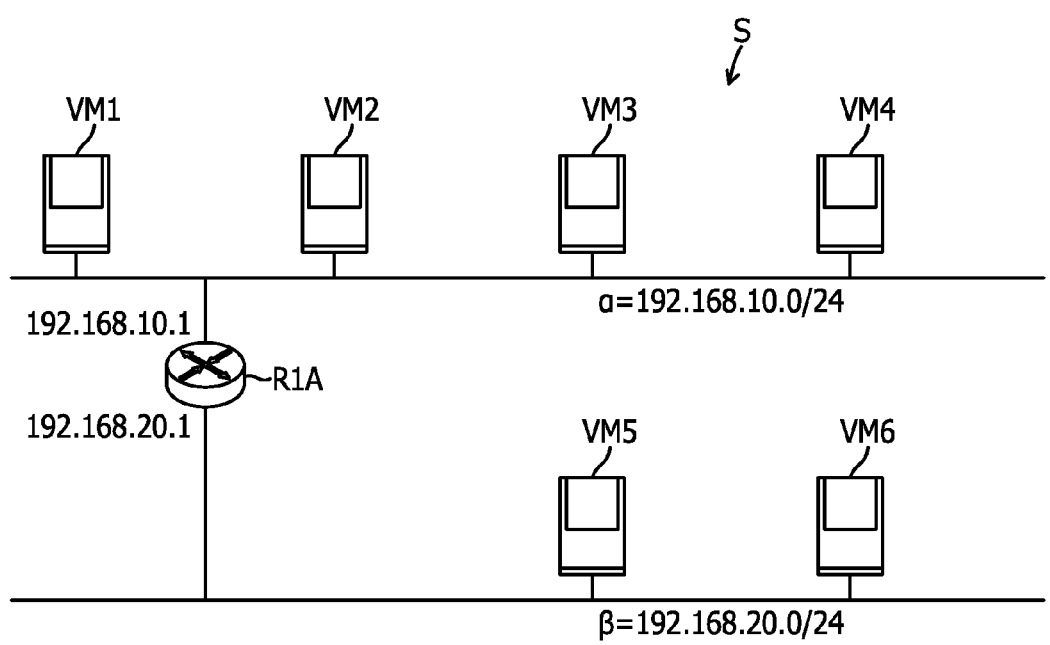
FIG. 4 illustrates an example of a system configuration of a virtual system S.

FIG. 4 illustrates an example of the system configuration of the virtual system S. In FIG. 4, the virtual system S includes virtual machines VM1 to VM6 and a virtual router R1A. In the virtual system S, the virtual machines VM1 to VM4 and the virtual router R1A are coupled by a virtual network α. In addition, the virtual machines VM5 and VM6 and the virtual router R1A are coupled by a virtual network β.

The range of the IP address of the virtual network α is "192.168.10.0/24". The range of the IP address of the virtual network β is "192.168.20.0/24". The IP address of a coupling interface to the virtual network α for the virtual router R1A is "192.168.10.1". In addition, the IP address of a coupling interface to the virtual network β for the virtual router R1A is "192.168.20.1".

While details will be described later using FIG. 8, the virtual machines VM1 to VM6 and the virtual router R1A are arranged in a rack group A in the initial state of the virtual system S. In other words, in the initial state of the virtual system S, the virtual machines VM1 to VM6 and the virtual router R1A each operate on one of the physical machines PM included in the rack group A.

(Storage Content of Virtual Machine Management Table 500)

Next, the storage content of a virtual machine management table 500 used by the control device 101 will be described. The virtual machine management table 500 is information for managing the virtual machines VM that form the virtual system S provided to the user. The virtual machine management table 500 is realized by a storage device such as, for example, the memory 302, the disk 305, or the like illustrated in FIG. 3.

Figure 5:
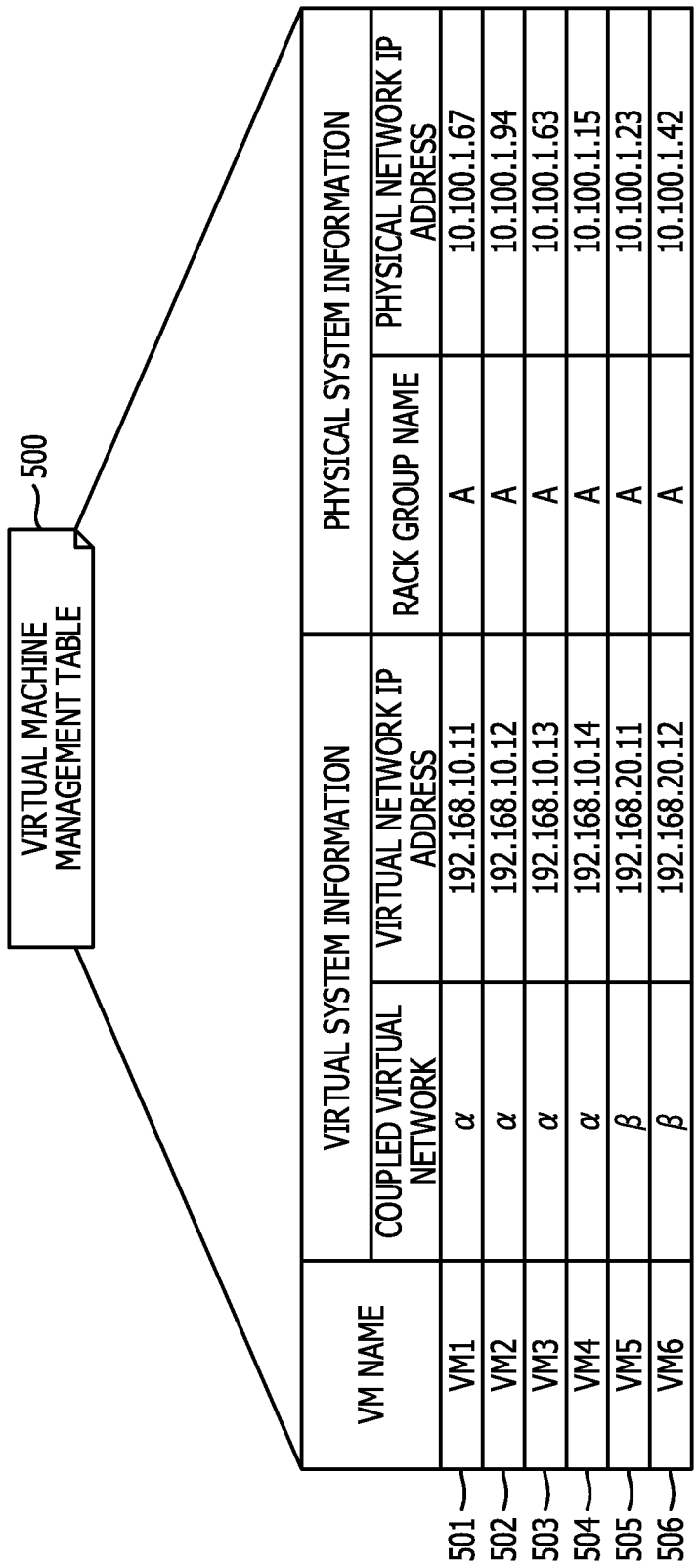
FIG. 5 illustrates an example of a storage content of a virtual machine management table 500.

FIG. 5 illustrates an example of the storage content of the virtual machine management table 500. In FIG. 5, the virtual machine management table 500 stores therein pieces of virtual machine information (for example, pieces of virtual machine information 501 to 506) for respective virtual machines VM for forming the virtual system S. Specifically, the pieces of virtual machine information 501 to 506 include the VM names, pieces of virtual system information, and pieces of physical system information of the respective virtual machines VM1 to VM6.

Here, the VM names are the identifiers of the virtual machines VM. The pieces of virtual system information each include a coupled virtual network and a virtual network IP address. The coupled virtual networks are virtual networks to which the respective virtual machines VM are coupled. The virtual network IP addresses are the IP addresses of coupling interfaces to the coupled virtual networks for the virtual machines VM, in other words, the IP addresses of the virtual machines VM in the coupled virtual networks. The pieces of physical system information each include a rack group name and a physical network IP address. The rack group names are the identifiers of rack groups in which the virtual machines VM are arranged. The physical network IP addresses are the IP addresses of physical machines PM on which the virtual machines VM operate.

For example, the virtual machine information 501 indicates the virtual network IP address, "192.168.10.11", of the virtual machine VM1 coupled to the virtual network α and the physical network IP address, "10.100.1.67", of a corresponding physical machine PM in the rack group A on which the virtual machine VM1 operates.

(Storage Content of Virtual Router Management Table 600)

Next, the storage content of a virtual router management table 600 used by the control device 101 will be described. The virtual router management table 600 is information used for managing the virtual routers R included in the virtual system S provided to the user. The virtual router management table 600 is realized by a storage device such as, for example, the memory 302 or the disk 305 illustrated in the FIG. 3.

Figure 6:
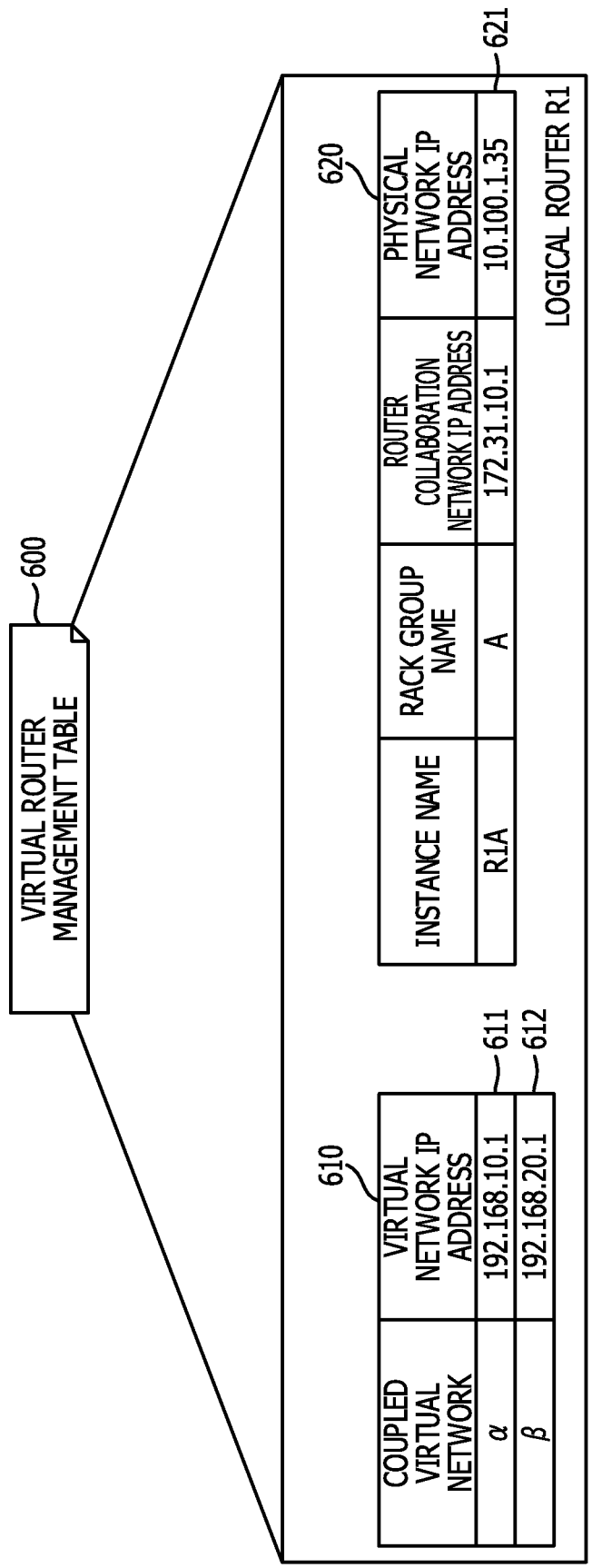
FIG. 6 illustrates an example of a storage content of a virtual router management table 600.

FIG. 6 illustrates an example of the storage content of the virtual router management table 600. In FIG. 6, the virtual router management table 600 includes logical router information 610 and virtual router information 620. The logical router information 610 includes the fields of a coupled virtual network and a virtual network IP address, and stores therein pieces of virtual network information (for example, pieces of virtual network information 611 and 612) as records by setting pieces of information in the individual fields.

Here, the term, "logical router", means one router as which the virtual router R included in the virtual system S is logically defined. In addition, the coupled virtual network is a virtual network to which a logical router is coupled. The virtual network IP address is the IP address of a coupling interface to the coupled virtual network for the logical router (virtual router R). For example, the virtual network information 611 indicates the virtual network IP address, "192.168.10.1", of a coupling interface to the virtual network α for the logical router R1.

The virtual router information 620 includes the fields of an instance name, a rack group name, a router collaboration network IP address, and a physical network IP address, and stores therein instance information (for example, instance information 621) as a record by setting pieces of information in the individual fields. Here, the instance name is the identifier of one of the virtual routers R. The rack group name is the identifier of the rack group rc in which the virtual router R is arranged.

The router collaboration network address is the IP address of a coupling interface to a virtual network for the virtual router R, the virtual network establishing coupling between the virtual routers R. An IP address for a router collaboration network may be prepared by the administrator or specified by the user. The physical network IP address is the IP address of a corresponding physical machine PM on which the virtual router R operates. For example, the instance information 621 indicates the router collaboration network IP address, "172.31.10.1", and the physical network IP address, "10.100.1.35", of the virtual router R1A arranged in the rack group A.

(Example of Functional Configuration of Control Device 101)

Figure 7:
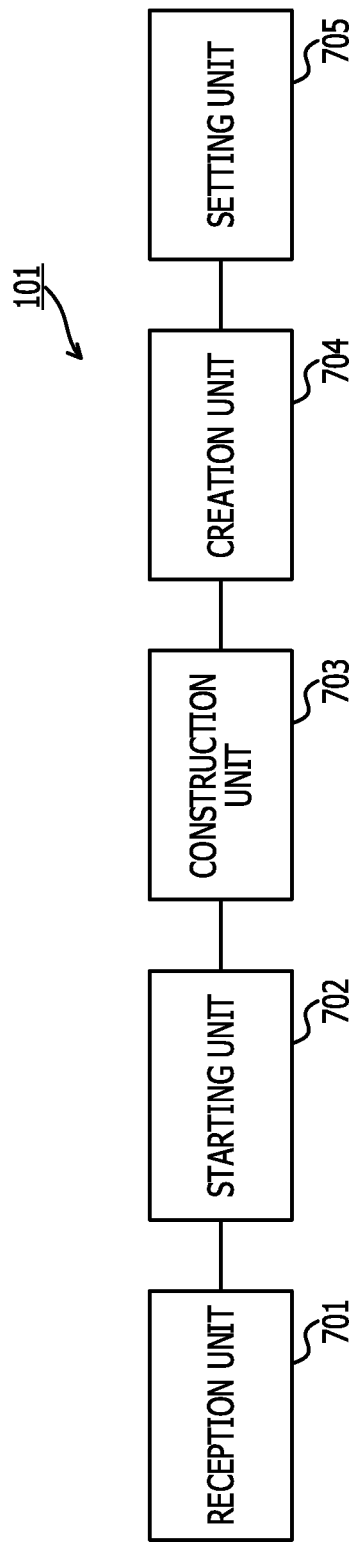
FIG. 7 illustrates an example of a functional configuration of the control device 101.

FIG. 7 illustrates an example of the functional configuration of the control device 101. In FIG. 7, the control device 101 has a configuration including a reception unit 701, a starting unit 702, a construction unit 703, a creation unit 704, and a setting unit 705. The reception unit 701 to the setting unit 705 realize a function to serve as a control unit, and, specifically, realize the function by causing the CPU 301 to execute a program stored in a storage device such as, for example, the memory 302 or the disk 305 illustrated in FIG. 3, or using the I/F 303. The processing results of the individual functional units are stored in a storage device such as, for example, the memory 302 or the disk 305.

The reception unit 701 has a function for receiving an arrangement change request for one of the virtual machines VM of the virtual machine VM group. Here, the virtual machine group VM is a set of the virtual machines VM for forming the virtual system S provided to the user. In addition, the arrangement change request is a request for migrating a virtual machine VM operating on a first physical machine PM onto a second physical machine PM.

The arrangement change request includes, for example, the VM name of a virtual machine VM serving as a migration target, the rack group name of a rack group rc serving as a migration destination, the physical network IP address of a physical machine PM, and so forth. Specifically, by receiving an operation input of the administrator from, for example, the administrator terminal 201 or by an operation input of the administrator utilizing a keyboard or a mouse in the management device 101, not illustrated, the reception unit 701 receives an arrangement change request for a virtual machine VM.

The starting unit 702 has a function for starting the virtual machines VM. Specifically, for example, in response to it that the reception unit 701 receives the arrangement change request for a virtual machine VM, the starting unit 702 migrates the virtual machine VM. Here, the migration of the virtual machine VM means migrating an OS or an application operating in a virtual machine VM to another virtual machine VM.

More specifically, the starting unit 702 migrates a virtual machine VM serving as a migration target onto another physical machine PM using, for example, live migration. The live migration means migrating a virtual machine VM currently operating on a physical machine PM to another physical machine PM nearly non-disruptively. According to the live migration, it is possible for a virtual machine VM on a physical machine PM to migrate a currently executed OS or application to another physical machine PM within a very short stop time.

In addition, in a case where the virtual machine M is migrated, the virtual machine information of the migrated virtual machine VM within the virtual machine management table 500 is updated. An example of an update of the virtual machine management table 500 will be described later using FIG. 9, FIG. 11, and FIG. 13.

In addition, the starting unit 702 has a function for starting the virtual routers R. Specifically, for example, in response to it that the reception unit 701 receives the arrangement change request for a virtual machine VM, the starting unit 702 starts a corresponding virtual router R in a rack group rc serving as a migration destination. More specifically, first, with reference to the virtual router management table 600 illustrated in FIG. 6, the starting unit 702 determines whether or not a virtual router R is arranged in the rack group rc serving as a migration destination.

Here, in a case where a virtual router R is not arranged in the rack group rc serving as a migration destination, the starting unit 702 starts, in the rack group rc serving as a migration destination, a virtual router R where the same virtual network IP address and MAC address as that of a virtual router R in a rack group rc serving as a migration source is set. On the other hand, in a case where a virtual router R has already been arranged in the rack group rc serving as a migration destination, the starting unit 702 does not start a virtual router R.

In addition, in a case where the virtual router R is started, the instance information of the started virtual router R is registered in the virtual router management table 600. An example of an update of the virtual router management table 600 will be described later using FIG. 9.

In addition, the reception unit 701 has a function for receiving a start request for one of the virtual machines VM of the virtual machine VM group. Here, the start request means a request for starting the virtual machine VM on a physical machine PM. The start request includes, for example, the VM name of a virtual machine VM serving as a start target, the rack group name of a rack group rc serving as a start destination, the physical network IP address of a physical machine PM, and so forth.

Specifically, by receiving an operation input of the administrator from, for example, the administrator terminal 201 or by an operation input of the administrator utilizing the keyboard or the mouse in the management device 101, not illustrated, the reception unit 701 receives a start request for a virtual machine VM. The start request is made in, for example, a case where a new virtual machine VM is added to the virtual system S.

In addition, in response to it that the reception unit 701 receives the start request for the virtual machine VM, the starting unit 702 starts the virtual machine VM on a physical machine PM serving as a start destination. In addition, in a case where the virtual machine VM is started, the virtual machine information of the started virtual machine VM is registered in the virtual machine management table 500.

In addition, in response to it that the reception unit 701 receives the start request for the virtual machine VM, the starting unit 702 starts the virtual router R in the rack group rc serving as a start destination. Specifically, first, with reference to, for example, the virtual router management table 600, the starting unit 702 determines whether or not a virtual router R is arranged in the rack group rc serving as a start destination.

Here, in a case where the virtual router R is not arranged in the rack group rc serving as a start destination, the starting unit 702 starts, in the rack group rc serving as a start destination, a virtual router R where the same virtual network IP address and MAC address as that of a virtual router R in another rack group rc is set. On the other hand, in a case where a virtual router R has already been arranged in the rack group rc serving as a start destination, the starting unit 702 does not start a virtual router R.

The construction unit 703 has a function for constructing a virtual network that establishes coupling between the virtual machines VM of the virtual machine VM group and couples virtual machines VM and a virtual router R within each rack group rc to each other. Specifically, with reference to, for example, the virtual machine management table 500, the construction unit 703 forms tunnels between the virtual machines VM. In addition, with reference to, for example, the virtual machine management table 500 and the virtual router management table 600, the construction unit 703 forms tunnels between the virtual machines VM and the virtual router R within each rack group rc. From this, the construction unit 703 constructs a virtual network of a data link layer. In the following description, the virtual network of a data link layer will be expressed as an "L2 virtual network" in some cases.

In addition, the construction unit 703 has a function for constructing a virtual network that establishes coupling between the virtual routers R started in the individual rack groups rc. Specifically, with reference to, for example, the virtual router management table 600, the construction unit 703 forms tunnels between the virtual routers R started in the individual rack groups rc, and hence, constructs a virtual network of a network layer. In the following description, the virtual network of a network layer will be expressed as an "L3 virtual network" in some cases.

In addition, a specific content of processing in the construction unit 703 for forming the tunnels between the virtual machines VM or the like will be described later using FIG. 17.

The creation unit 704 has a function for creating the routing table T corresponding to the virtual router R started in each rack group rc. Specifically, first, as for, for example, each of the virtual routers R started in the individual rack groups rc, with respect to each virtual machine VM of the virtual machine VM group, the creation unit 704 determines whether or not the virtual machine VM exists in the same rack group as the virtual router R.

Here, in a case of existing in the same rack group, the creation unit 704 associates a virtual network IP address in the L2 virtual network of the virtual router R with a virtual network IP address in the L2 virtual network of the virtual machine VM. On the other hand, in a case of not existing in the same rack group, the creation unit 704 associates, with the virtual network IP address of the virtual machine VM in the L2 virtual network, the router collaboration network IP address of another virtual router R in the L3 virtual network, the other virtual router R being located in the same rack group as the virtual machine VM. From this, it is possible to create the routing table T corresponding to the virtual router R started in each rack group rc. In addition, an example of the creation of the routing table T corresponding to the virtual router R will be described later using FIG. 14 and FIG. 15.

The setting unit 705 has a function for setting, in the virtual router R, the routing table T that corresponds to the virtual router R and is created by the creation unit 704. Specifically, by transmitting, for example, the routing table T corresponding to each virtual router R to the corresponding virtual router R, the setting unit 705 sets the routing table T in each virtual router R.

In addition, the reception unit 701 has a function for receiving a stop request for one of the virtual machines VM of the virtual machine VM group. Here, the stop request means a request for stopping a virtual machine VM operating on a physical machine PM. The stop request includes, for example, the VM name of a virtual machine VM serving as a stop target, the rack group name of a rack group rc serving as a stop destination, the physical network IP address of a physical machine PM, and so forth.

Specifically, by receiving an operation input of the administrator from, for example, the administrator terminal 201 or by an operation input of the administrator utilizing the keyboard or the mouse in the management device 101, not illustrated, the reception unit 701 receives a stop request for a virtual machine VM.

In addition, in response to it that the reception unit 701 receives the stop request for the virtual machine VM, the starting unit 702 stops the virtual machine VM serving as a stop target. In addition, in a case where the virtual machine VM is stopped, the virtual machine information of the stopped virtual machine VM is deleted from the virtual machine management table 500.

In addition, the starting unit 702 has a function for stopping the virtual routers R. Specifically, for example, in response to it that the reception unit 701 receives the stop request for the virtual machine VM, the starting unit 702 references the virtual machine management table 500, and determines whether or not another virtual machine VM different from the virtual machine VM serving as a stop target is arranged in the rack group rc serving as a stop destination.

Here, in a case where no other virtual machine VM is arranged in the rack group rc serving as a stop destination, the starting unit 702 stops the virtual router R of the rack group rc serving as a stop destination. On the other hand, in a case where another virtual machine VM is arranged in the rack group rc serving as a stop destination, the starting unit 702 does not stop the virtual router R. In addition, in a case where the virtual router R is stopped, the instance information of the stopped virtual router R is deleted from the virtual router management table 600.

In addition, in response to it that the reception unit 701 receives an arrangement change request for a virtual machine VM, the starting unit 702 references the virtual machine management table 500, and determines whether or not another virtual machine VM different from the virtual machine VM serving as a migration target is arranged in a rack group rc serving as a migration source. Here, in a case where no other virtual machine VM is arranged in the rack group rc serving as a migration source, the starting unit 702 stops the virtual router R of the rack group rc serving as a migration source. On the other hand, in a case where the other virtual machine VM is arranged in the rack group rc serving as a migration source, the starting unit 702 does not stop the virtual router R.

(Example of State Transition of Virtual System S)

Next, an example of the state transition of the virtual system S will be described. Here, an example of the state transition of the virtual system S will be described that includes the virtual machines VM1 to VM6 and the virtual router R1A (see, for example, FIG. 5 and FIG. 6).

FIG. 8 illustrates an example of the state transition of the virtual system S. In FIG. 8, in a state 0 (initial state), the virtual system S is arranged in the rack group A. In addition, the L2 virtual network α is constructed that establishes coupling between the virtual machines VM of the virtual machines VM1 to VM4 and couples the individual virtual machines VM1 to VM4 and the virtual router R1A within the rack group A to each other. In addition, the L2 virtual network β is constructed that establishes coupling between the virtual machines VM5 and VM6 and couples the individual virtual machines VM5 and VM6 and the virtual router R1A within the rack group A to each other.

<State 0 ⇒ State 1>

Here, a case of migrating the virtual machine VM4 to a rack group B will be assumed. In this case, in association with the migration of the virtual machine VM4, a virtual router R1B is started within the rack group B, and the virtual system S transitions from a state 0 to a state 1.

In the state 1, the virtual machines VM1 to VM3, VM5, and VM6 and the virtual router R1A are arranged in the rack group A, and the virtual machine VM4 and the virtual router R1B are arranged in the rack group B. As a result, the virtual network α is constructed that establishes coupling between individual virtual machines VM of the virtual machines VM1 to VM4, couples the individual virtual machines VM1 to VM3 and the virtual router R1A within the rack group A to each other, and couples the virtual machine VM4 and the virtual router R1B within the rack group B to each other. In addition, a router collaboration network is constructed that establishes coupling between the virtual routers R1A and R1B started in the rack groups A and B, respectively. This router collaboration network is a L3 virtual network. In addition, the L2 virtual network β is the same as that in the state 0.

<Examples of Updates of Virtual Machine Management Table 500 and Virtual Router Management Table 600 (Part 1)>

Here, there will be described examples of updates of the virtual machine management table 500 and the virtual router management table 600 in a case where the virtual system S transitions from the state 0 to the state 1.

FIG. 9 illustrates examples of updates of the virtual machine management table 500 and the virtual router management table 600. In FIG. 9, as a result of the migration of the virtual machine VM4 from the rack group A to the rack group B, the virtual machine information 504 within the virtual machine management table 500 is updated. Specifically, the rack group name is updated to the rack group name, "B", of the rack group B serving as a migration destination, and the physical network IP address of the virtual machine VM4 is updated to the IP address, "10.100.2.72", of a physical machine PM serving as a migration destination.

In addition, as a result of the migration of the virtual machine VM4 from the rack group A to the rack group B, the instance information 622 of the virtual router R1B is newly registered within the virtual router information 620 in the virtual router management table 600. The instance information 622 indicates the router collaboration network IP address, "172.31.10.2", and the physical network IP address, "10.100.2.22", of the virtual router R1B arranged in the rack group B.

<State 1 ⇒ State 2>

Next, a case of migrating the virtual machine VM6 to the rack group B will be assumed. In this case, as a result of the migration of the virtual machine VM6 to the rack group B, the virtual system S transitions from the state 1 to a state 2. In this case, since the virtual router R1B has already been arranged in the rack group B, no new virtual router R is started in association with the migration of the virtual machine VM6.

Figure 10:
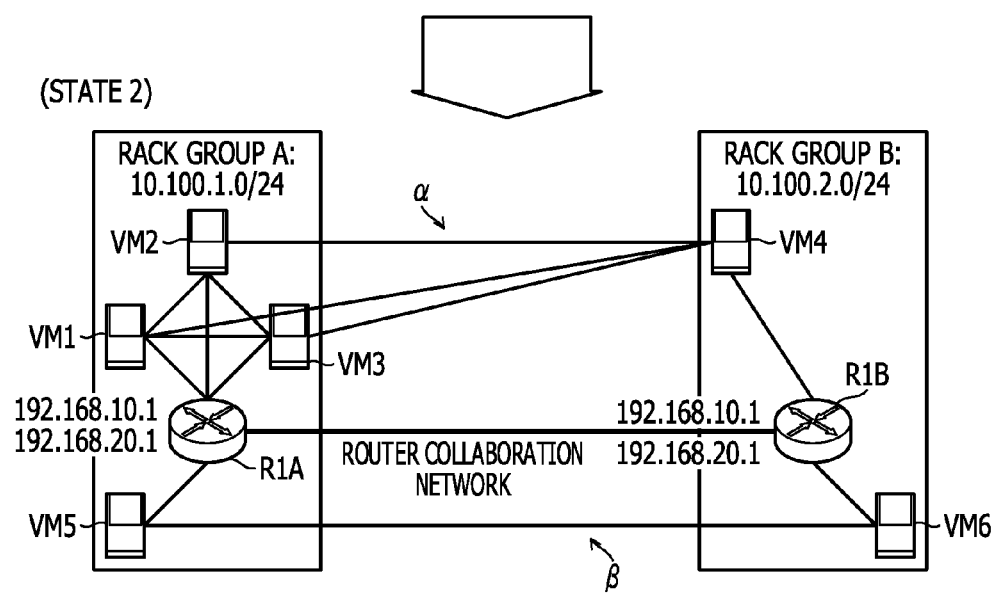
FIG. 10 illustrates an example of a state transition of the virtual system S.

FIG. 10 illustrates an example of the state transition of the virtual system S. In FIG. 10, in the state 2, the virtual machines VM1 to VM3 and VM5 and the virtual router R1A are arranged in the rack group A, and the virtual machines VM4 and VM6 and the virtual router R1B are arranged in the rack group B. As a result, the L2 virtual network β is constructed that establishes coupling between the virtual machines VM5 and VM6 and couples the virtual machine VM6 and the virtual router R1B within the rack group B to each other. In addition, the router collaboration network that establishes coupling between the virtual routers R1A and R1B is the same as that in the state 1. In addition, the L2 virtual network α is the same as that in the state 1.

<Examples of Updates of Virtual Machine Management Table 500 and Virtual Router Management Table 600 (Part 2)>

Here, there will be described examples of updates of the virtual machine management table 500 and the virtual router management table 600 in a case where the virtual system S transitions from the state 1 to the state 2.

Figure 11:
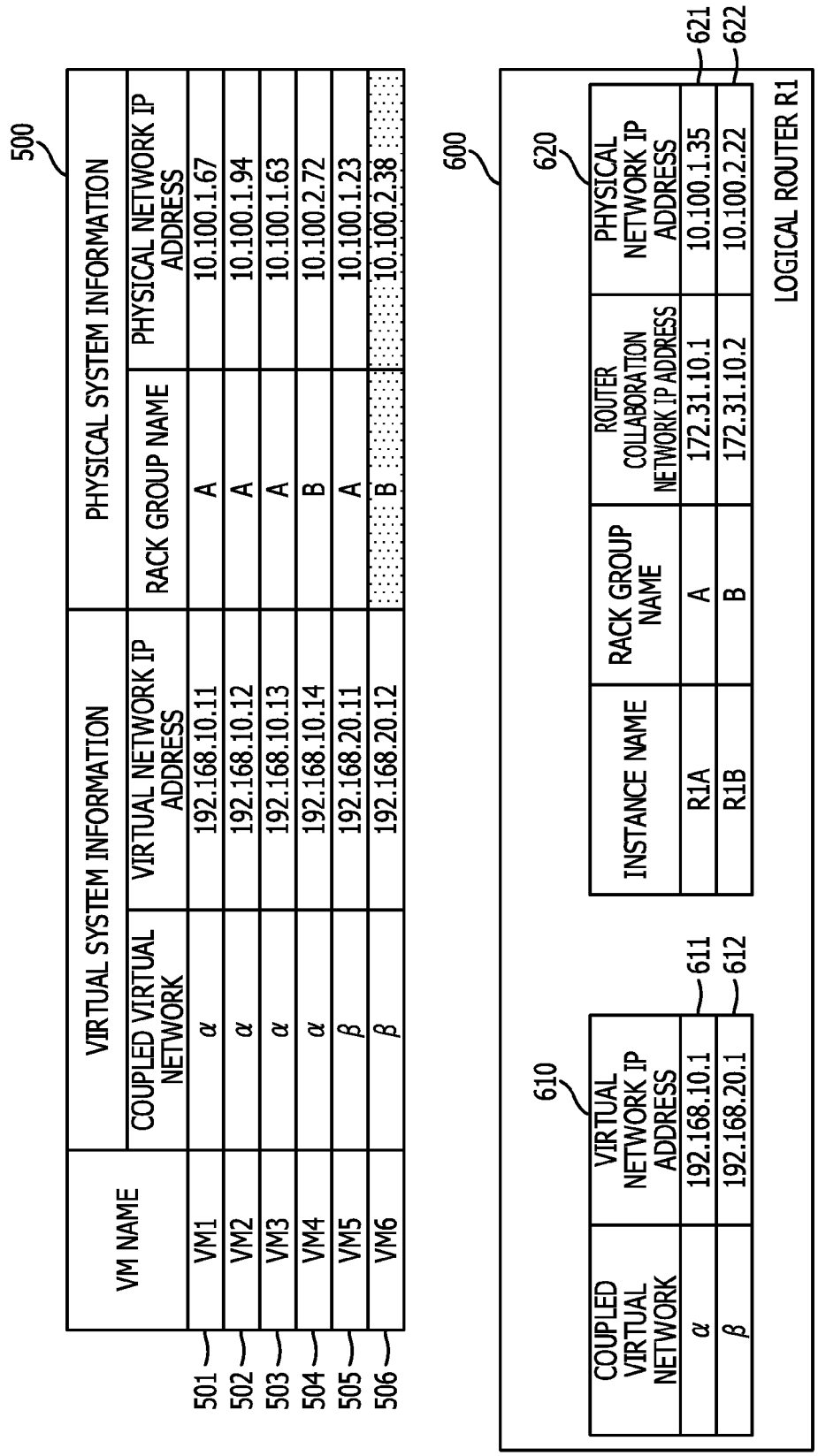
FIG. 11 illustrates examples of updates of the virtual machine management table 500 and the virtual router management table 600.

FIG. 11 illustrates examples of updates of the virtual machine management table 500 and the virtual router management table 600. In FIG. 11, as a result of the migration of the virtual machine VM6 from the rack group A to the rack group B, the virtual machine information 506 within the virtual machine management table 500 is updated. Specifically, the rack group name is updated to the rack group name, "B", of the rack group B serving as a migration destination, and the physical network IP address of the virtual machine VM6 is updated to the IP address, "10.100.2.38", of a physical machine PM serving as a migration destination. Since the virtual router R1B has already been arranged in the rack group B, the storage content of the virtual router management table 600 does not change.

<State 2 ⇒ State 3>

Next, a case of migrating the virtual machine VM3 to the rack group B will be assumed. In this case, as a result of the migration of the virtual machine VM3 to the rack group B, the virtual system S transitions from the state 2 to a state 3. In this case, since the virtual router R1B has already been arranged in the rack group B, no new virtual router R is started in association with the migration of the virtual machine VM3.

Figure 12:
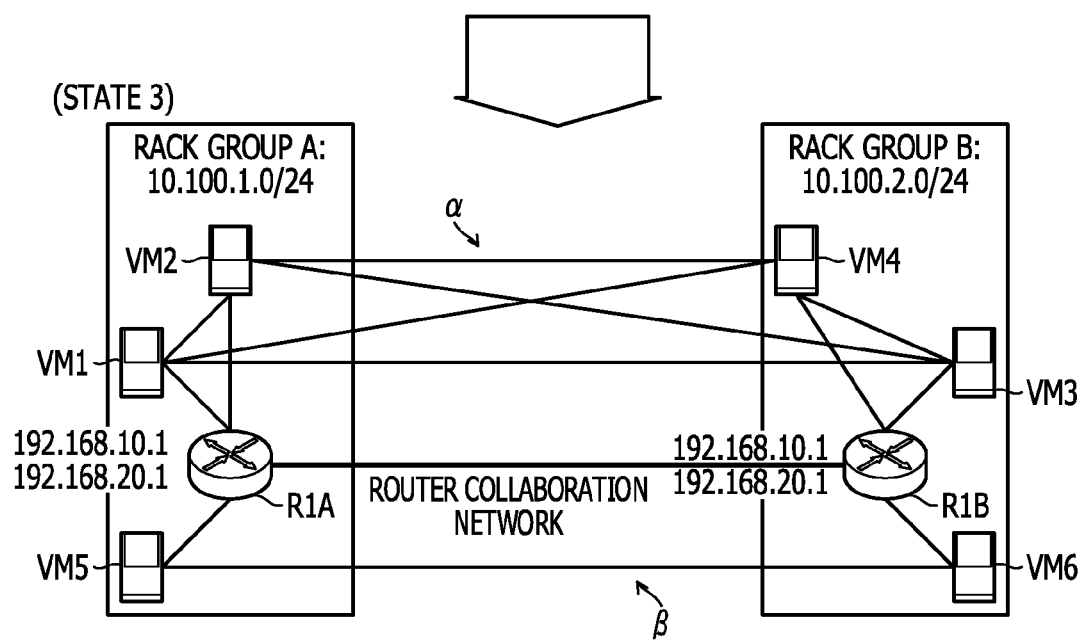
FIG. 12 illustrates an example of a state transition of the virtual system S.

FIG. 12 illustrates an example of the state transition of the virtual system S. In FIG. 12, in the state 3, the virtual machines VM1, VM2, and VM5 and the virtual router R1A are arranged in the rack group A, and the virtual machines VM3, VM4, and VM6 and the virtual router R1B are arranged in the rack group B.

As a result, the L2 virtual network α is constructed that establishes coupling between virtual machines VM of the virtual machines VM1 to VM4, couples the individual virtual machines VM1 and VM2 and the virtual router R1A within the rack group A to each other, and couples the virtual machines VM3 and VM4 and the virtual router R1B within the rack group B to each other. In addition, the router collaboration network that establishes coupling between the virtual routers R1A and R1B is the same as that in the state 2. In addition, the L2 virtual network β is the same as that in the state 2.

<Examples of Updates of Virtual Machine Management Table 500 and Virtual Router Management Table 600 (Part 3)>

Here, there will be described examples of updates of the virtual machine management table 500 and the virtual router management table 600 in a case where the virtual system S transitions from the state 2 to the state 3.

FIG. 13 illustrates examples of updates of the virtual machine management table 500 and the virtual router management table 600. In FIG. 13, as a result of the migration of the virtual machine VM3 from the rack group A to the rack group B, the virtual machine information 503 within the virtual machine management table 500 is updated. Specifically, the rack group name is updated to the rack group name, "B", of the rack group B serving as a migration destination, and the physical network IP address of the virtual machine VM3 is updated to the IP address, "10.100.2.87", of a physical machine PM serving as a migration destination. Since the virtual router R1B has already been arranged in the rack group B, the storage content of the virtual router management table 600 does not change.

(Example of Creation of Routing Table T)

Next, an example of creation of the routing table T corresponding to each virtual router R will be described. Here, based on the storage contents of the virtual machine management table 500 and the virtual router management table 600 illustrated in FIG. 13, an example of the creation of the routing table T corresponding to the virtual router R1A of the rack group A will be described.

Figure 14:
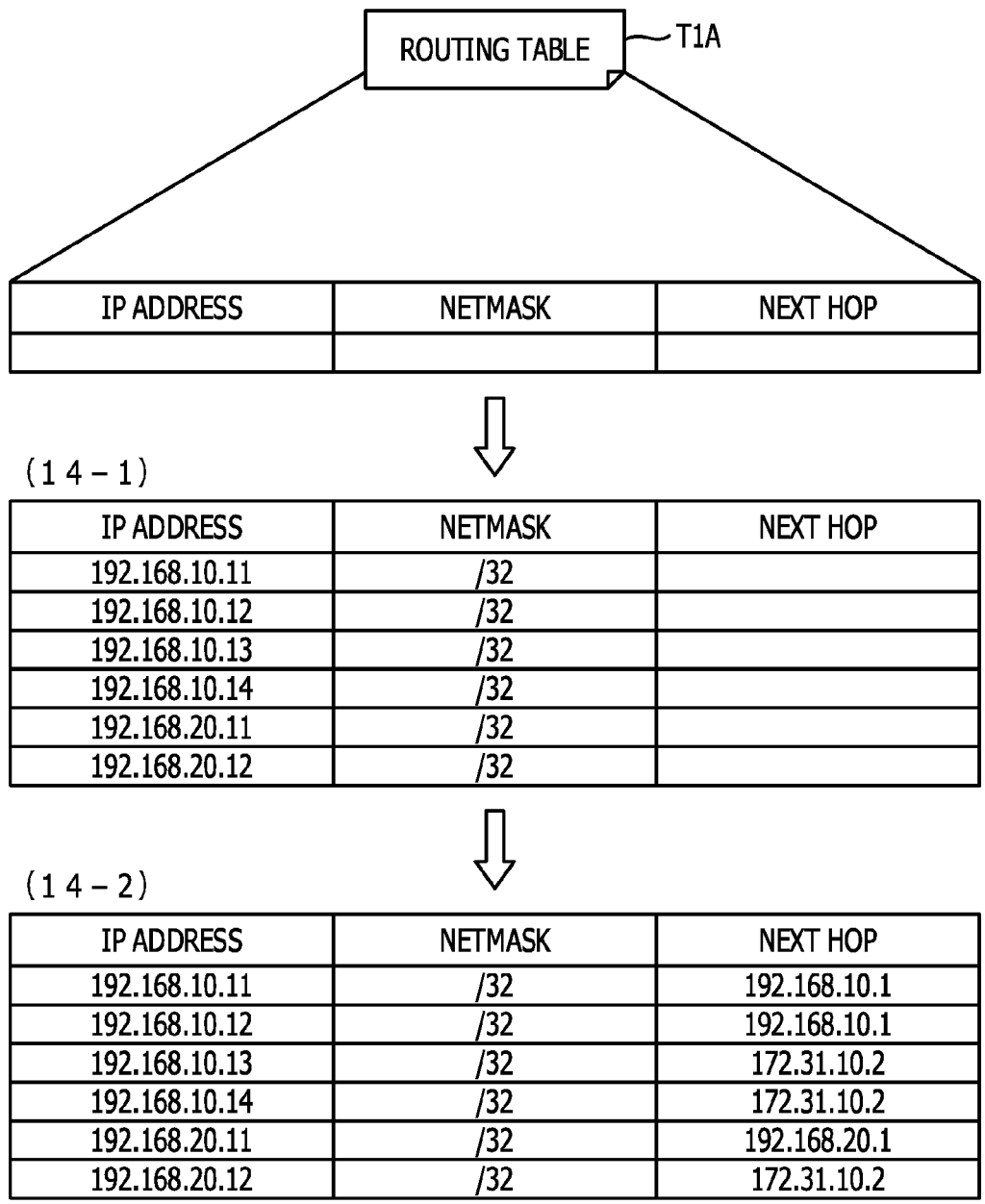
FIG. 14 and FIG. 15 illustrate examples of creation of a routing table T.

FIG. 14 illustrates an example of the creation of the routing table T. In FIG. 14, a routing table T1A includes fields of an IP address, a netmask, and a next hop, and stores therein the path information of each destination as a record by setting information in each field.

Here, the IP address is the virtual network IP address of a virtual machine VM to be the destination of a packet. The netmask is a value used for identifying a network address and a host address out of the IP address. The next hop is the IP address of a sending destination to which the packet is to be transferred next.

First, with reference to the virtual machine management table 500, the creation unit 704 sets, in the IP address field of the routing table T1A, the virtual network IP addresses of the individual virtual machines VM1 to VM6. In addition, the creation unit 704 sets, in the netmask field of the routing table T1A, "/32" indicating 32 bits (see (14-1) in FIG. 14).

Next, with reference to the virtual machine management table 500 and the virtual router management table 600, the creation unit 704 sets, in the next hop field of the routing table T1A, the IP address of a sending destination to which a packet is to be transferred next (see (14-2) in FIG. 14).

Here, if the virtual machine VM1 (a destination) is cited as an example, the creation unit 704 determines whether or not the rack group A of the virtual machine VM1 and the rack group A of the virtual router R1A are identical with each other. Here, the rack group A of the virtual machine VM1 and the rack group A of the virtual router R1A are identical with each other. In this case, the creation unit 704 sets, in the next hop field, the virtual network IP address, "192.168.10.1", of an coupling interface to the virtual network α for the virtual router R1A, the virtual network α including the virtual machine VM1.

In addition, if the virtual machine VM3 (a destination) is cited as an example, the creation unit 704 determines whether or not the rack group B of the virtual machine VM3 and the rack group A of the virtual router R1A are identical with each other. Here, the rack group B of the virtual machine VM3 and the rack group A of the virtual router R1A are not identical with each other. In this case, the creation unit 704 sets, in the next hop field, the router collaboration network IP address, "172.31.10.2", of the virtual router R1B of the rack group B in which the virtual machine VM3 is arranged.

In addition, if the virtual machine VM5 (a destination) is cited as an example, the creation unit 704 determines whether or not the rack group A of the virtual machine VM5 and the rack group A of the virtual router R1A are identical with each other. Here, the rack group A of the virtual machine VM5 and the rack group A of the virtual router R1A are identical with each other. In this case, the creation unit 704 sets, in the next hop field, the virtual network IP address, "192.168.20.1", of an coupling interface to the virtual network β for the virtual router R1A, the virtual network β including the virtual machine VM5.

Next, based on the storage contents of the virtual machine management table 500 and the virtual router management table 600 illustrated in FIG. 13, an example of creation of the routing table T corresponding to the virtual router R1B of the rack group B will be described.

Figure 15:
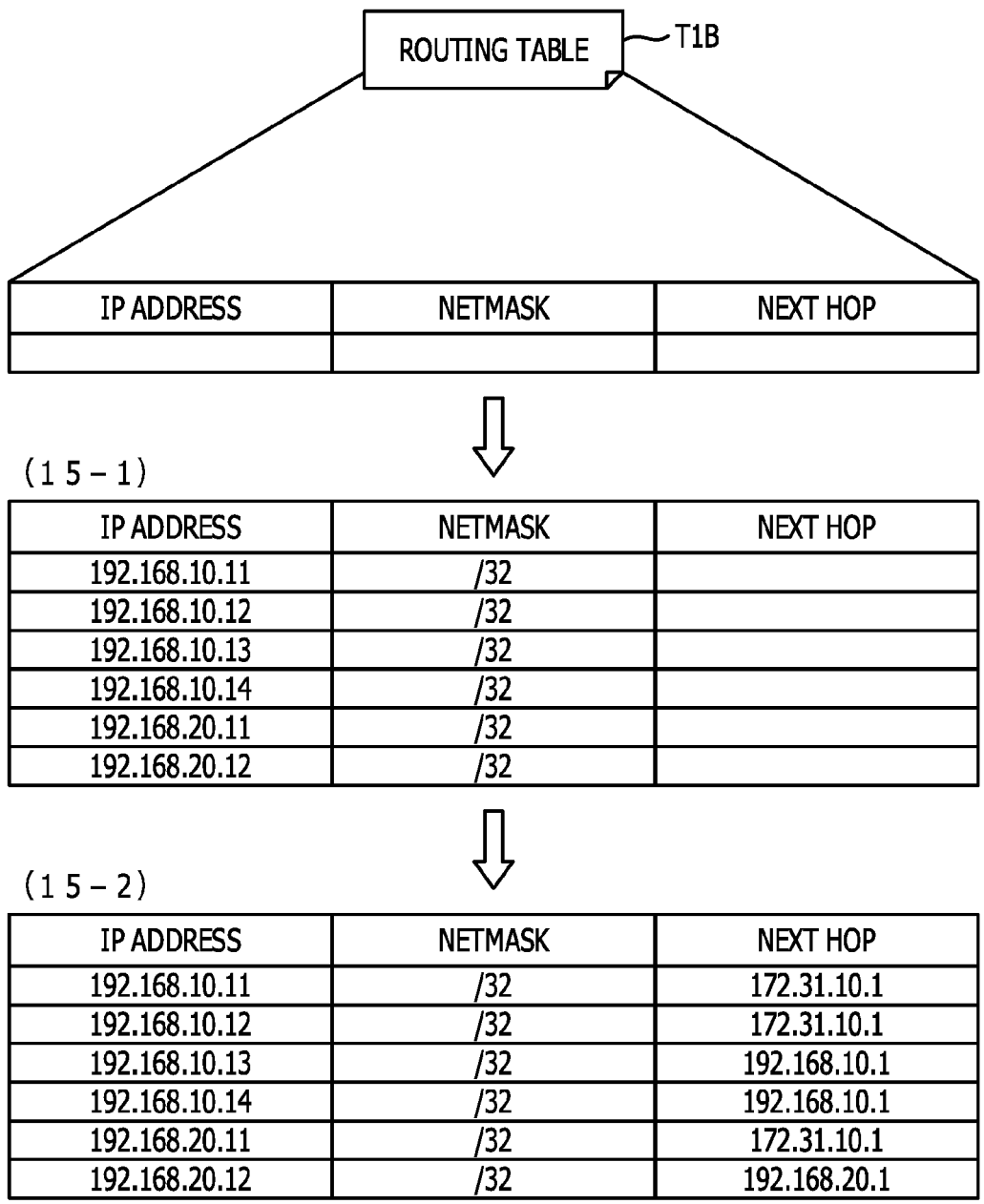

FIG. 15 illustrates an example of the creation of the routing table T. In FIG. 15, first, with reference to the virtual machine management table 500, the creation unit 704 sets, in the IP address field of a routing table T1B, the virtual network IP addresses of the individual virtual machines VM1 to VM6. In addition, the creation unit 704 sets, in the netmask field of the routing table T1B, "/32" indicating 32 bits (see (15-1) in FIG. 15).

Next, with reference to the virtual machine management table 500 and the virtual router management table 600, the creation unit 704 sets, in the next hop field of the routing table T1B, the IP address of a sending destination to which a packet is to be transferred next (see (15-2) in FIG. 15).

Here, if the virtual machine VM1 (a destination) is cited as an example, the creation unit 704 determines whether or not the rack group A of the virtual machine VM1 and the rack group B of the virtual router R1B are identical with each other. Here, the rack group A of the virtual machine VM1 and the rack group B of the virtual router R1B are not identical with each other. In this case, the creation unit 704 sets, in the next hop field, the router collaboration network IP address, "172.31.10.1", of the virtual router R1A of the rack group A in which the virtual machine VM1 is arranged.

Here, if the virtual machine VM3 (a destination) is cited as an example, the creation unit 704 determines whether or not the rack group B of the virtual machine VM3 and the rack group B of the virtual router R1B are identical with each other. Here, the rack group B of the virtual machine VM3 and the rack group B of the virtual router R1B are identical with each other. In this case, the creation unit 704 sets, in the next hop field, the virtual network IP address, "192.168.10.1", of an coupling interface to the virtual network α for the virtual router R1B, the virtual network α including the virtual machine VM3.

In addition, if the virtual machine VM6 (a destination) is cited as an example, the creation unit 704 determines whether or not the rack group B of the virtual machine VM6 and the rack group B of the virtual router R1B are identical with each other. Here, the rack group B of the virtual machine VM6 and the rack group B of the virtual router R1B are identical with each other. In this case, the creation unit 704 sets, in the next hop field, the virtual network IP address, "192.168.20.1", of an coupling interface to the virtual network β for the virtual router R1B, the virtual network β including the virtual machine VM6.

According to the above-mentioned routing tables T1A and T1B, it is possible to perform routing between the virtual machines VM of the same rack group rc using the virtual router R of the same rack group rc. In addition, after being passed from a virtual machine VM to the virtual router R within a first rack group rc, a packet passes through the router collaboration network (the L3 virtual network) between the virtual routers R, and is passed to the virtual router R of a second rack group rc in which the virtual machine VM serving as a destination exists. Accordingly, it is possible to realize packet transfer beyond the first rack group rc.

(Example of Construction of L2 Virtual Network)

Next, an example of construction of the L2 virtual network will be described. Here, a case where tunnels between virtual machines VM are formed will be cited as an example, and an example of the construction of the L2 virtual network will be described.

Figure 16:
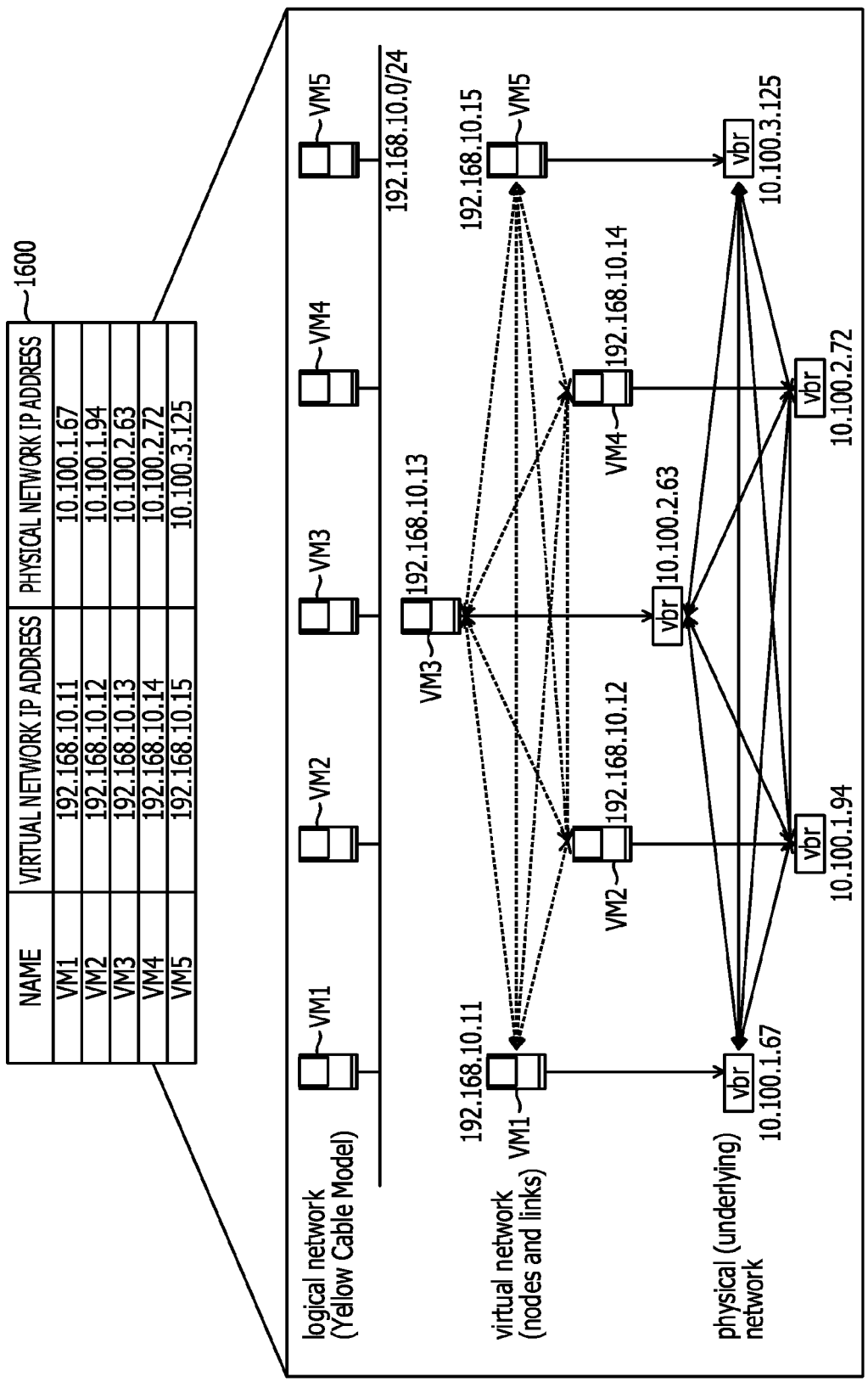
FIG. 16 illustrates an example of construction of an L2 virtual network.

FIG. 16 illustrates an example of the construction of the L2 virtual network. Here, an example of the construction of the L2 virtual network based on a virtual machine management table 1600 will be described. In this regard, however, in FIG. 16, part of the virtual machine management table 1600 is extracted and displayed.

Specifically, first, with reference to, for example, the virtual machine management table 1600, the construction unit 703 forms the tunnels between the individual virtual machines VM. The tunnels between the individual virtual machines VM each have a full mesh configuration. In addition, by coupling the end points of the individual tunnels to virtual bridges vbr on physical machines PM, the construction unit 703 constructs the L2 virtual network.

Each of the virtual bridges vbr transfers, to one of the virtual machines VM, a packet that arrives from a tunnel, and does not transfer the packet to a tunnel. In addition, each of the virtual bridges vbr performs communication with another virtual bridge vbr while encapsulating a packet, and cancels encapsulation at the time of transferring the packet to one of the virtual machines VM. The encapsulation means defining data and a procedure to operate the data as an "object" while integrating the data and the procedure to operate the data with each other and concealing, from the outside, detailed specifications within the object and a structure thereof.

From this, using the virtual bridges vbr operating on the physical machines PM and the tunnels between the virtual machines VM, it is possible to construct the L2 virtual network. In addition, transfer of a packet in a tunnel network is stopped by one link, and it is possible to avoid a loop.

(Example of Distributed Arrangement of Virtual Machine VM Group in Three Rack Groups)

While, in the above-mentioned description, a case where the virtual machine VM group is distributedly arranged in the two rack groups rc has been described, the virtual machine VM group may be distributedly arranged in three or more rack groups rc.

Figure 17:
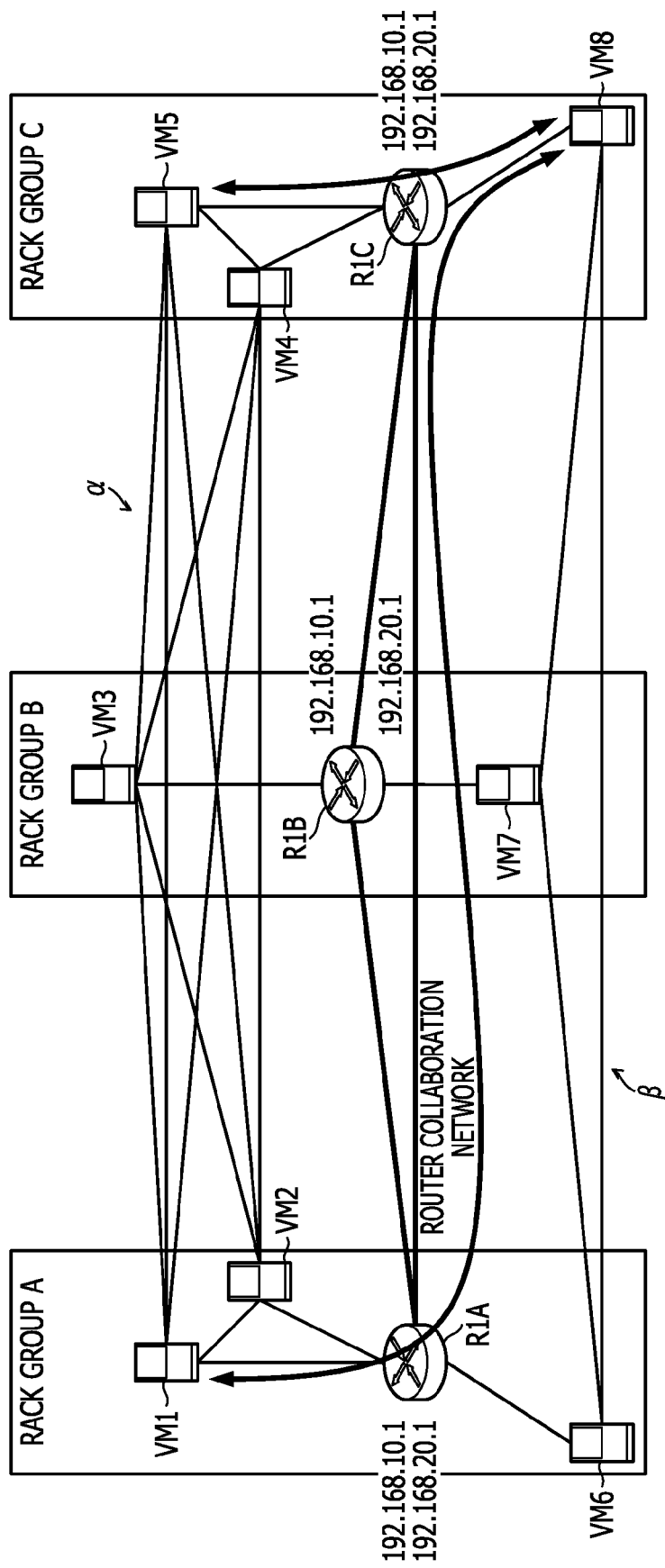
FIG. 17 illustrates an example of a distributed arrangement of a virtual machine VM group in three rack groups.

FIG. 17 illustrates an example of the distributed arrangement of the virtual machine VM group in three rack groups. In FIG. 17, the virtual machines VM1, VM2, and VM6 and the virtual router R1A are arranged in the rack group A, the virtual machines VM3 and VM7 and the virtual router R1B are arranged in the rack group B, and the virtual machines VM4, VM5, and VM8 and a virtual router R1C are arranged in a rack group C.

As a result, the L2 virtual network α is constructed that establishes coupling between the individual virtual machines VM of the virtual machines VM1 to VM5, couples the individual virtual machines VM1 and VM2 and the virtual router R1A within the rack group A to each other, couples the virtual machine VM3 and the virtual router R1B within the rack group B to each other, and couples the individual virtual machines VM4 and VM5 and the virtual router R1C within the rack group C to each other.

In addition, the L2 virtual network β is constructed that establishes coupling between the individual virtual machines VM of the virtual machines VM6 to VM8, couples the virtual machine VM6 and the virtual router R1A within the rack group A to each other, couples the virtual machine VM7 and the virtual router R1B within the rack group B to each other, and couples the virtual machine VM8 and the virtual router R1C within the rack group C to each other. In addition, a router collaboration network is constructed that couples the virtual routers R1A, R1B, and R1C started in the rack groups A, B, and C, respectively, to one another.

(Procedure of First Control Processing in Control Device 101)

Next, a procedure of first control processing in the control device 101 will be described. The first control processing is control processing in the control device 101, executed in a case where a virtual machine VM is migrated.

Figure 18:
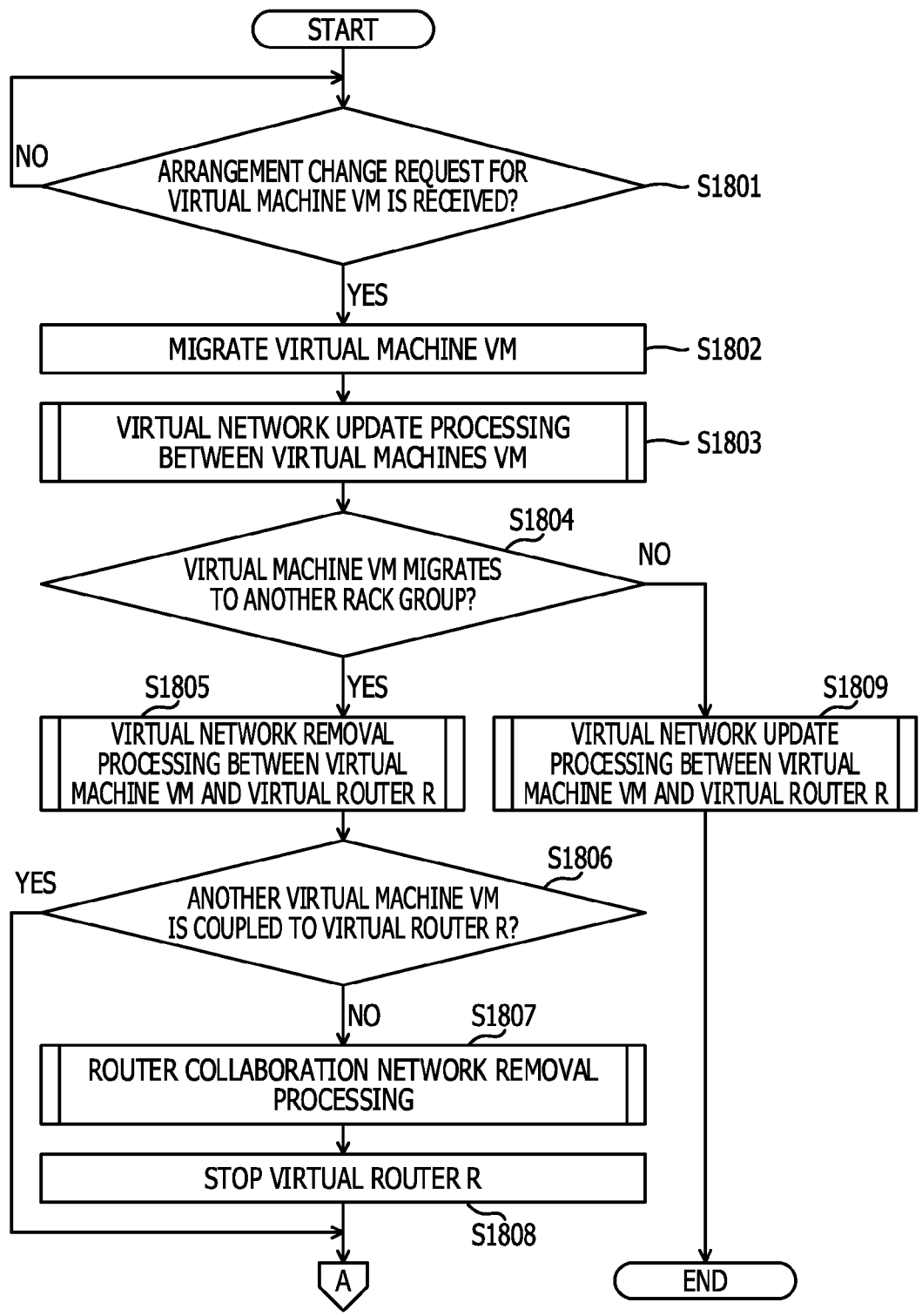
FIG. 18 and FIG. 19 are flowcharts illustrating an example of a procedure of first control processing in the control device 101.
Figure 19:
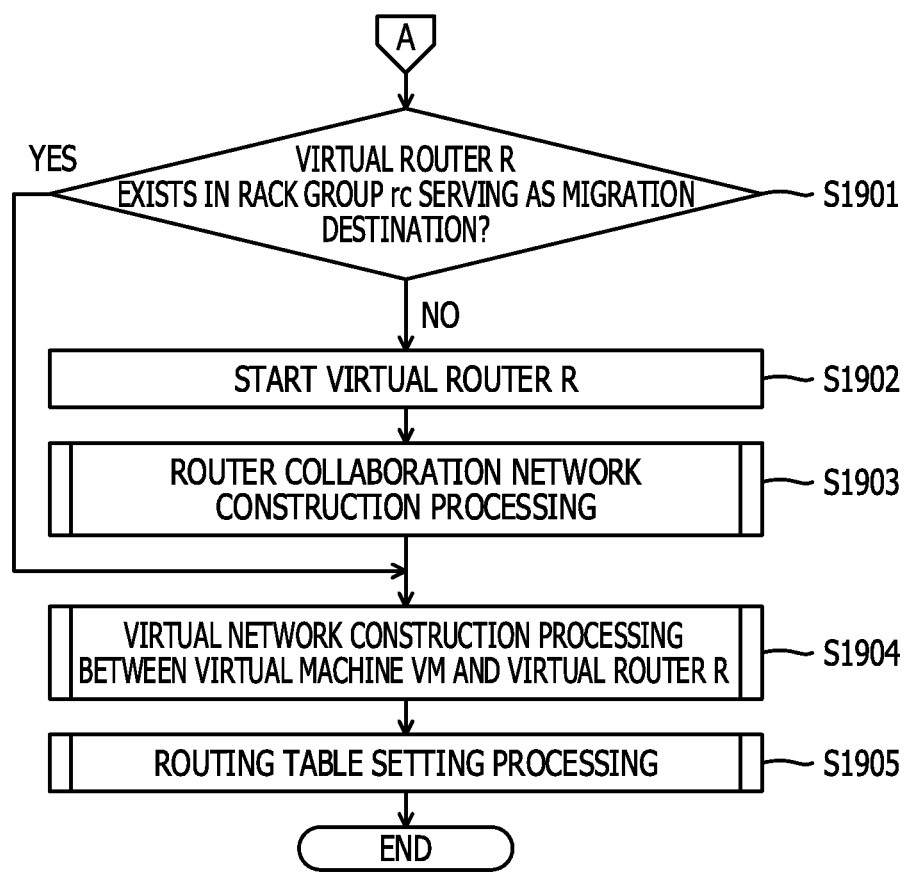

FIG. 18 and FIG. 19 are flowcharts illustrating an example of a procedure of the first control processing in the control device 101. In the flowchart of FIG. 18, first, the control device 101 determines whether or not an arrangement change request for one of the virtual machines VM of the virtual machine VM group is received (step S1801). Here, the control device 101 waits for the arrangement change request for the corresponding virtual machine VM to be received (step S1801: No).

In addition, in a case of having received the arrangement change request for the corresponding virtual machine VM (step S1801: Yes), the control device 101 migrates the corresponding virtual machine VM (step S1802). In addition, the control device 101 executes virtual network update processing between the virtual machines VM (step S1803). A specific processing procedure of the virtual network update processing between the virtual machines VM will be described later using FIG. 20.

Next, the control device 101 determines whether or not the corresponding virtual machine VM migrates to another rack group (step S1804). Here, in a case where the corresponding virtual machine VM migrates to the other rack group (step S1804: Yes), the control device 101 executes virtual network removal processing between the virtual machine VM and the virtual router R (step S1805). A specific processing procedure of the virtual network removal processing between the virtual machine VM and the virtual router R will be described later using FIG. 21.

Next, the control device 101 determines whether or not another virtual machine VM different from the virtual machine VM serving as a migration target is coupled to the virtual router R of the rack group rc serving as a migration source (step S1806). Here, in a case where the other virtual machine VM is coupled (step S1806: Yes), the control device 101 shifts to a step S1901 illustrated in FIG. 19.

On the other hand, in a case where the other virtual machine VM is not coupled (step S1806: No), the control device 101 executes router collaboration network removal processing (step S1807). A specific processing procedure of the router collaboration network removal processing will be described later using FIG. 22. In addition, the control device 101 stops the virtual router R of the rack group rc serving as a migration source (step S1808), and shifts to the step S1901 illustrated in FIG. 19.

In addition, in a case where, in the step S1804, the corresponding virtual machine VM does not migrate to another rack group (step S1804: No), the control device 101 executes virtual network update processing between the virtual machine VM and the virtual router R (step S1809), and terminates a series of processing operations based on the present flowchart. A specific processing procedure of the virtual network update processing between the virtual machine VM and the virtual router R will be described later using FIG. 23.

In the flowchart in FIG. 19, first, with reference to the virtual router management table 600, the control device 101 determines whether or not a virtual router R exists in a rack group rc serving as a migration destination (step S1901). Here, in a case where the virtual router R exists (step S1901: Yes), the control device 101 shifts to a step S1904.

On the other hand, in a case where the virtual router R does not exist (step S1901: No), the control device 101 starts a virtual router R in the rack group rc serving as a migration destination (step S1902). In addition, the control device 101 executes router collaboration network construction processing (step S1903). A specific processing procedure of the router collaboration network construction processing will be described later using FIG. 24.

Next, the control device 101 executes virtual network construction processing between the virtual machine VM and the virtual router R (step S1904). A specific processing procedure of the virtual network construction processing between the virtual machine VM and the virtual router R will be described later using FIG. 25.

In addition, the control device 101 executes routing table setting processing for setting the routing table T in the virtual router R (step S1905), and terminates a series of processing operations based on the present flowchart. A specific processing procedure of the routing table setting processing will be described later using FIG. 26.

From this, in association with the migration of the virtual machine VM, it is possible to construct or reconstruct the L2 virtual network and the L3 virtual network, and it is possible to set the routing table T in each virtual router R.

<Procedure of Virtual Network Update Processing Between Virtual Machines VM>

Next, a specific processing procedure of the virtual network update processing between the virtual machines in the step S1803 VM illustrated in FIG. 18 will be described. In the following description, in some cases, a virtual machine VM to serve as a migration target is expressed as a "migration machine", and another virtual machine VM different from the migration machine is expressed as an "existing machine".

Figure 20:
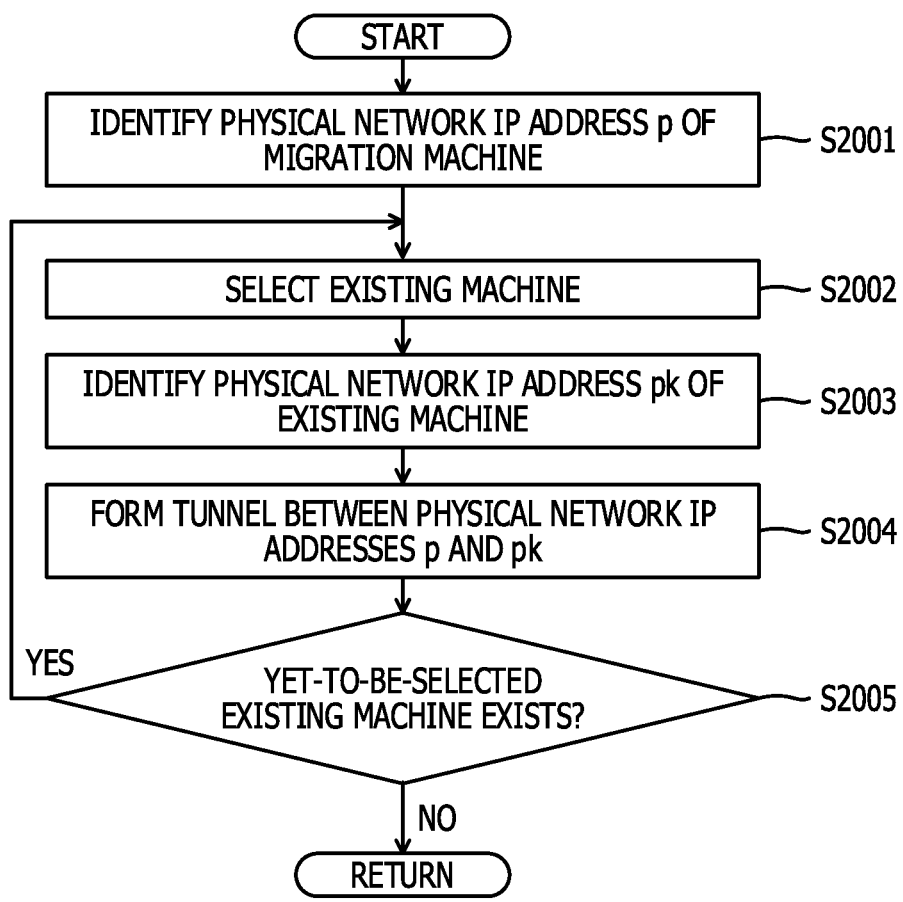
FIG. 20 is a flowchart illustrating an example of a specific processing procedure of virtual network update processing between virtual machines VM.

FIG. 20 is a flowchart illustrating an example of a specific processing procedure of virtual network update processing between virtual machines VM. In the flowchart in FIG. 20, first, with reference to the virtual machine management table 500, the control device 101 identifies the physical network IP address p of the migration machine (step S2001).

Next, with reference to the virtual machine management table 500, the control device 101 selects an existing machine (step S2002), and identifies the physical network IP address pk of the existing machine (step S2003). In addition, the control device 101 forms a tunnel between the physical network IP addresses p and pk (step S2004).

Next, with reference to the virtual machine management table 500, the control device 101 determines whether or not a yet-to-be-selected existing machine that is not selected exists (step S2005). Here, in a case where the yet-to-be-selected existing machine exists (step S2005: Yes), the control device 101 returns to the step S2002, and selects the yet-to-be-selected existing machine.

On the other hand, in a case where a yet-to-be-selected existing machine does not exist (step S2005: No), the control device 101 returns to a step in which the virtual network update processing between the virtual machines VM is called out. From this, in association with the migration of the virtual machine VM, it is possible to reconstruct the L2 virtual network between the virtual machines VM.

<Procedure of Virtual Network Removal Processing Between Virtual Machine VM and Virtual Router R>

Next, a specific processing procedure of the virtual network removal processing between the virtual machine VM and the virtual router R in the step S1805 illustrated in FIG. 18 will be described.

Figure 21:
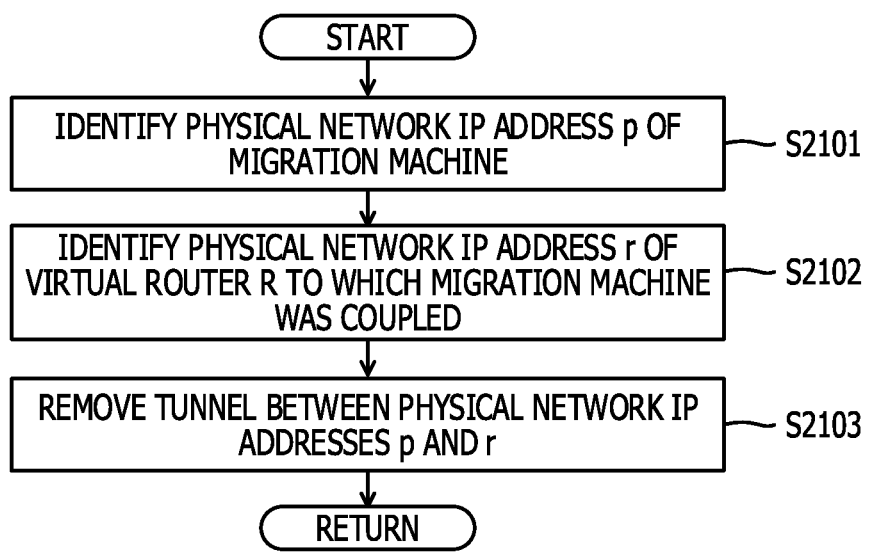
FIG. 21 is a flowchart illustrating an example of a specific processing procedure of virtual network removal processing between a virtual machine VM and a virtual router R.

FIG. 21 is a flowchart illustrating an example of a specific processing procedure of the virtual network removal processing between the virtual machine VM and the virtual router R. In the flowchart in FIG. 21, first, with reference to the virtual machine management table 500, the control device 101 identifies the physical network IP address p of the migration machine (step S2101).

Next, with reference to the virtual machine management table 500 and the virtual router management table 600, the control device 101 identifies the physical network IP address r of the virtual router R of the rack group rc that serves as a migration source and to which the migration machine was coupled (step S2102).

In addition, the control device 101 removes (deletes) a tunnel between the physical network IP addresses p and r (step S2103), and returns to a step in which the virtual network removal processing between the virtual machine VM and the virtual router R is called out. From this, in association with the migration of the virtual machine VM, it is possible to remove the tunnel for coupling the virtual machine VM and the virtual router R to each other.

<Procedure of Router Collaboration Network Removal Processing>

Next, a specific processing procedure of the router collaboration network removal processing in the step S1807 illustrated in FIG. 18 will be described. In the following description, in some cases, a virtual router R to serve as a stop target is expressed as a "removal router".

Figure 22:
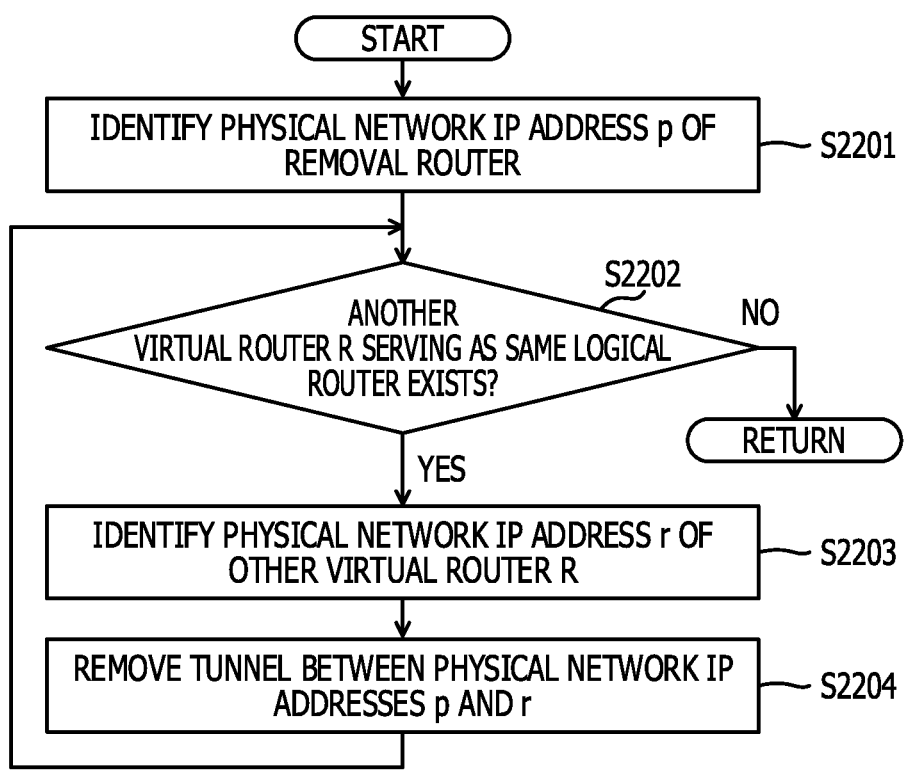
FIG. 22 is a flowchart illustrating an example of a specific processing procedure of router collaboration network removal processing.

FIG. 22 is a flowchart illustrating an example of a specific processing procedure of the router collaboration network removal processing. In the flowchart in FIG. 22, first, with reference to the virtual router management table 600, the control device 101 identifies the physical network IP address p of the removal router (step S2201).

Next, with reference to the virtual router management table 600, the control device 101 determines whether or not another virtual router R serving as the same logical router as the removal router exists (step S2202). Here, in a case where the other virtual router R exists (step S2202: Yes), the control device 101 identifies the physical network IP address r of the other virtual router R, with reference to the virtual router management table 600 (step S2203).

In addition, the control device 101 removes a tunnel between the physical network IP addresses p and r (step S2204), and returns to the step S2202. In addition, in a case where, in the step S2202, the other virtual router R does not exist (step S2202: No), the control device 101 returns to a step in which the router collaboration network removal processing is called out. From this, in association with the stop of the virtual router R, it is possible to remove the tunnel for coupling the virtual routers R to each other.

<Procedure of Virtual Network Update Processing Between Virtual Machine VM and Virtual Router R>

Next, a specific processing procedure of the virtual network update processing between the virtual machine VM and the virtual router R in the step S1809 illustrated in FIG. 18 will be described.

Figure 23:
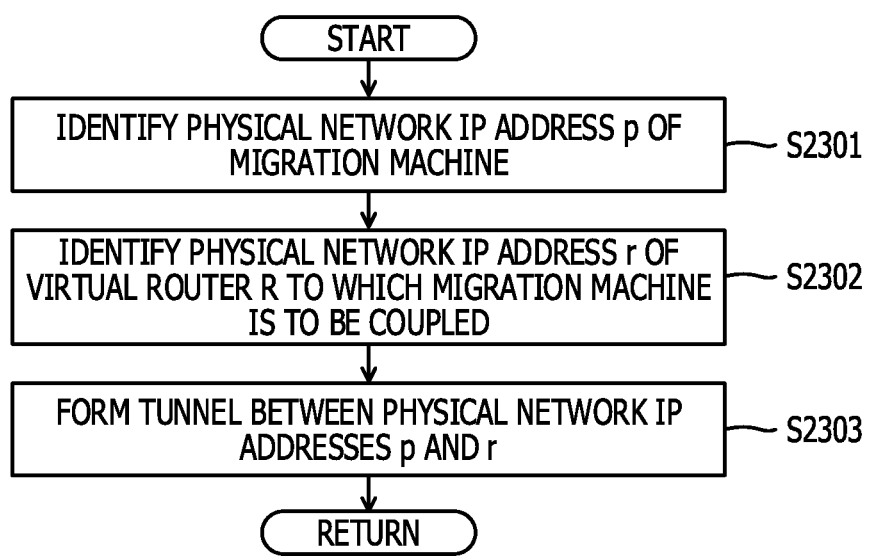
FIG. 23 is a flowchart illustrating an example of a specific processing procedure of virtual network update processing between a virtual machine VM and the virtual router R.

FIG. 23 is a flowchart illustrating an example of a specific processing procedure of the virtual network update processing between the virtual machine VM and the virtual router R. In the flowchart in FIG. 23, first, with reference to the virtual machine management table 500, the control device 101 identifies the physical network IP address p of the migration machine (step S2301).

Next, with reference to the virtual machine management table 500 and the virtual router management table 600, the control device 101 identifies the physical network IP address r of the virtual router R of the rack group rc that serves as a migration destination and to which the migration machine is to be coupled (step S2302).

In addition, the control device 101 forms a tunnel between the physical network IP addresses p and r (step S2303), and returns to a step in which the virtual network update processing between the virtual machine VM and the virtual router R is called out. From this, in association with the migration of the virtual machine VM, it is possible to establish the tunnel for coupling the virtual machine VM and the virtual router R to each other.

<Procedure of Router Collaboration Network Construction Processing>

Next, a specific processing procedure of the router collaboration network construction processing in the step S1903 illustrated in FIG. 19 will be described. In the following description, a virtual router R started in a rack group rc is expressed as an "additional router" in some cases.

Figure 24:
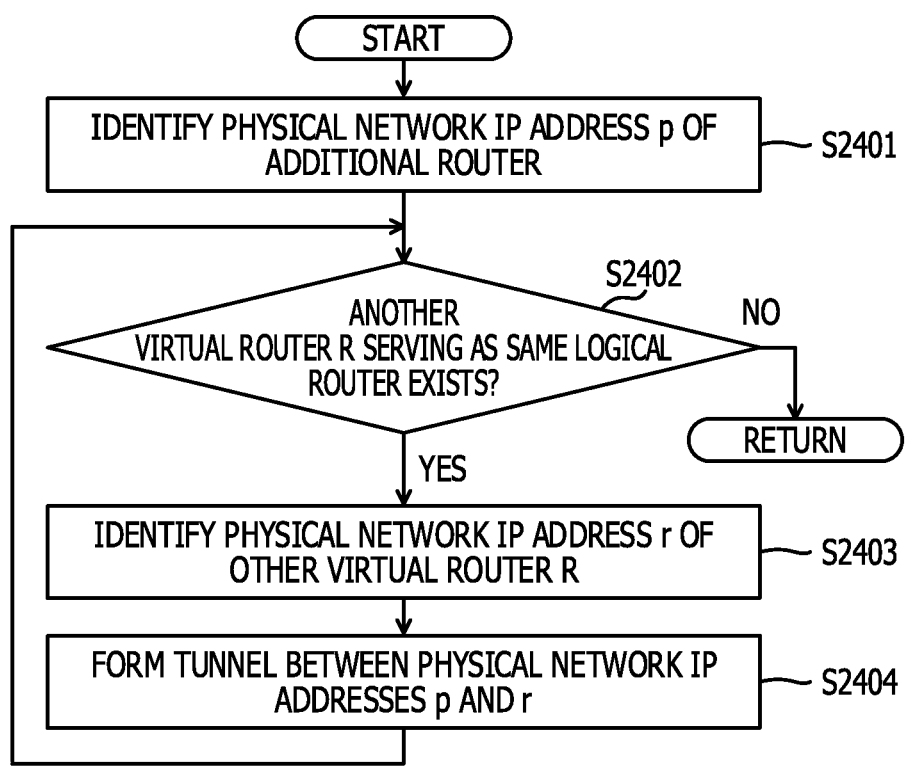
FIG. 24 is a flowchart illustrating an example of a specific processing procedure of router collaboration network construction processing.

FIG. 24 is a flowchart illustrating an example of a specific processing procedure of the router collaboration network construction processing. In the flowchart in FIG. 24, first, with reference to the virtual router management table 600, the control device 101 identifies the physical network IP address p of the additional router (step S2401).

Next, with reference to the virtual router management table 600, the control device 101 determines whether or not another virtual router R serving as the same logical router as the additional router exists (step S2402). Here, in a case where the other virtual router R exists (step S2402: Yes), the control device 101 identifies the physical network IP address r of the other virtual router R, with reference to the virtual router management table 600 (step S2403).

In addition, the control device 101 forms a tunnel between the physical network IP addresses p and r (step S2404), and returns to the step S2402. In addition, in a case where, in the step S2402, the other virtual router R does not exist (step S2402: No), the control device 101 returns to a step in which the router collaboration network construction processing is called out. From this, in association with the start of the virtual router R, it is possible to establish the tunnel for coupling the virtual routers R to each other.

<Procedure of Virtual Network Construction Processing Between Virtual Machine VM and Virtual Router R>

Next, a specific processing procedure of the virtual network construction processing between the virtual machine VM and the virtual router R in the step S1904 illustrated in FIG. 19 will be described.

Figure 25:
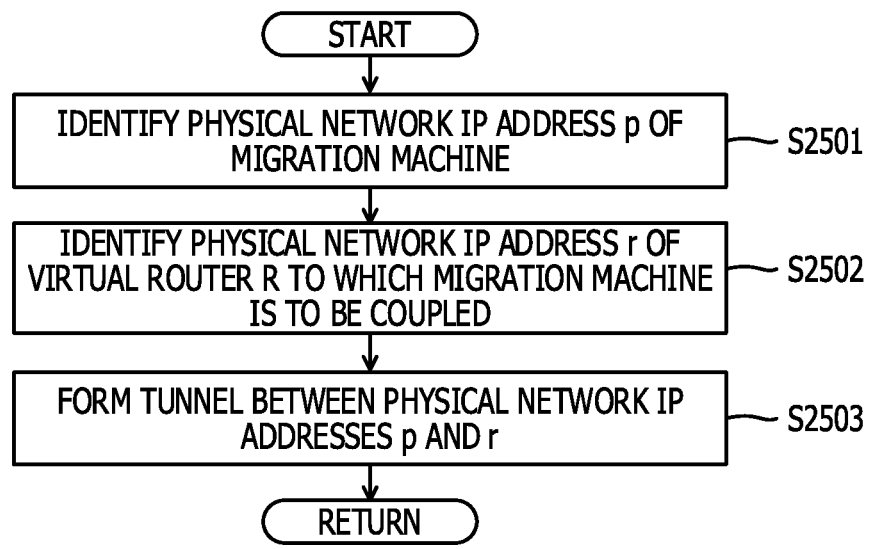
FIG. 25 is a flowchart illustrating an example of a specific processing procedure of virtual network construction processing between a virtual machine VM and the virtual router R.

FIG. 25 is a flowchart illustrating an example of a specific processing procedure of the virtual network construction processing between the virtual machine VM and the virtual router R. In the flowchart in FIG. 25, first, with reference to the virtual machine management table 500, the control device 101 identifies the physical network IP address p of the migration machine (step S2501).

Next, with reference to the virtual machine management table 500 and the virtual router management table 600, the control device 101 identifies the physical network IP address r of the virtual router R in the rack group rc that serves as a migration destination and to which the migration machine is to be coupled (step S2502).

In addition, the control device 101 forms a tunnel between the physical network IP addresses p and r (step S2503), and returns to a step in which the virtual network construction processing between the virtual machine VM and the virtual router R is called out. From this, in association with the migration of the virtual machine VM, it is possible to establish the tunnel for coupling the virtual machine VM and the virtual router R to each other.

<Procedure of Routing Table Setting Processing>

Next, a specific processing procedure of the routing table setting processing in the step S1905 illustrated in FIG. 19 will be described.

Figure 26:
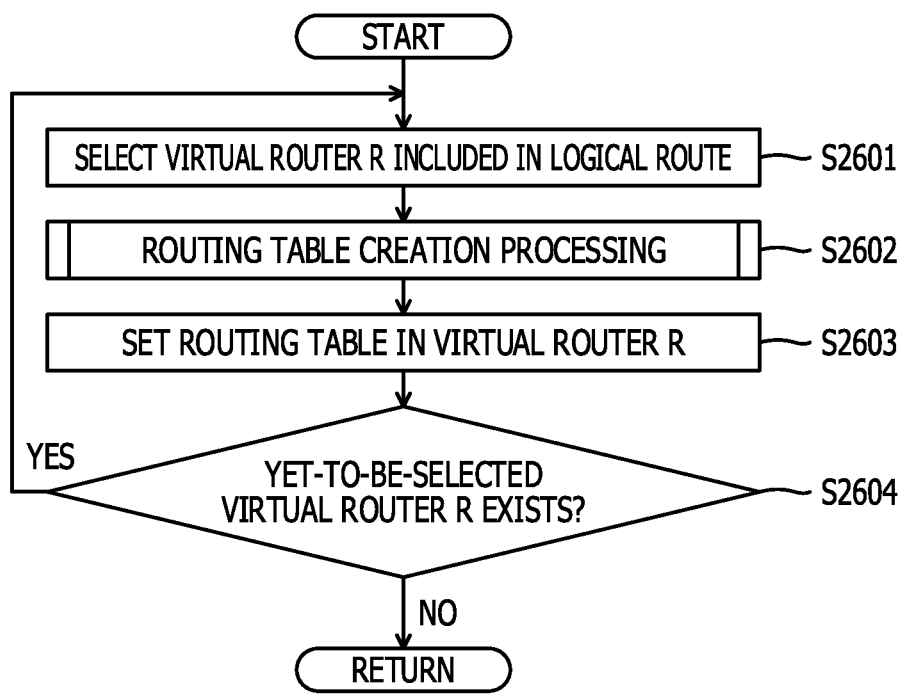
FIG. 26 is a flowchart illustrating an example of a specific processing procedure of routing table setting processing.

FIG. 26 is a flowchart illustrating an example of a specific processing procedure of the routing table setting processing. In the flowchart in FIG. 26, first, with reference to the virtual router management table 600, the control device 101 selects a virtual router R included in a logical router (step S2601).

Next, with reference to the virtual machine management table 500 and the virtual router management table 600, the control device 101 executes the routing table creation processing for creating the routing table T corresponding to the selected virtual router R (step S2602). In addition, the control device 101 sets the created routing table T, in the virtual router R (step S2603).

Next, with reference to the virtual router management table 600, the control device 101 determines whether or not a yet-to-be-selected virtual router R that is not selected exists (step S2604). Here, in a case where the yet-to-be-selected virtual router R exists (step S2604: Yes), the control device 101 returns to the step S2601, and selects the yet-to-be-selected virtual router R included in the logical router, with reference to the virtual router management table 600.

On the other hand, in a case where the yet-to-be-selected virtual router R does not exist (step S2604: No), the control device 101 returns to a step in which the routing table setting processing is called out. From this, it is possible to set the routing table T, in each virtual router R included in the logical router.

<Procedure of Routing Table Creation Processing>

Next, a specific processing procedure of the routing table creation processing in the step S2602 illustrated in FIG. 26 will be described.

Figure 27:
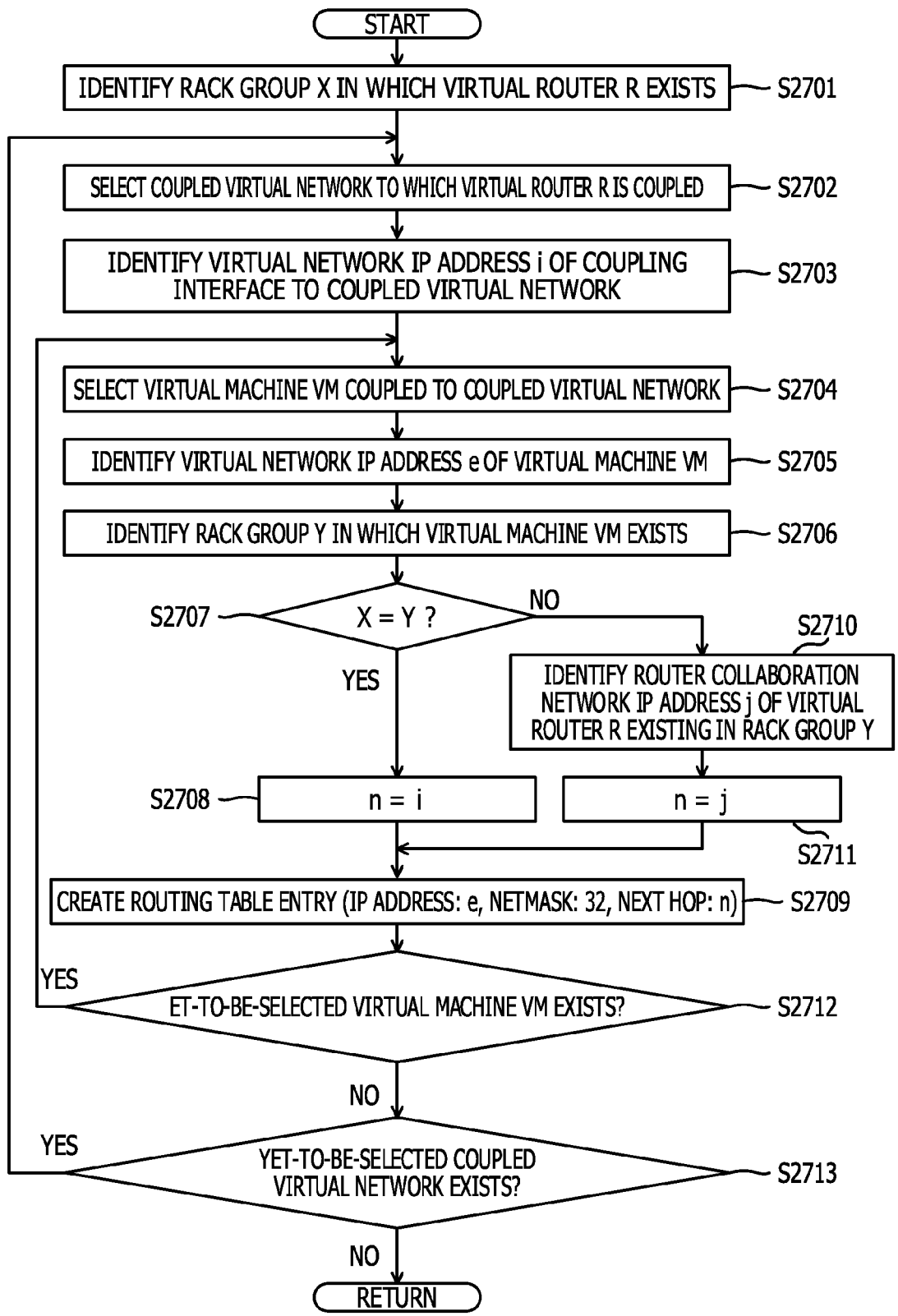
FIG. 27 is a flowchart illustrating an example of a specific processing procedure of the routing table setting processing.

FIG. 27 is a flowchart illustrating an example of a specific processing procedure of the routing table setting processing. In the flowchart in FIG. 27, first, with reference to the virtual router management table 600, the control device 101 identifies a rack group X in which a virtual router R exists (step S2701). Next, with reference to the virtual router management table 600, the control device 101 selects a coupled virtual network to which the virtual router R is coupled (step S2702).

In addition, with reference to the virtual router management table 600, the control device 101 identifies the virtual network IP address i of a coupling interface to the coupled virtual network for the virtual router R (step S2703). Next, with reference to the virtual machine management table 500, the control device 101 selects a virtual machine VM coupled to the coupled virtual network (step S2704).

In addition, with reference to the virtual machine management table 500, the control device 101 identifies the virtual network IP address e of the virtual machine VM in the coupled virtual network (step S2705), and identifies a rack group Y in which the virtual machine VM exists (step S2706). Next, the control device 101 determines whether or not the rack group X and the rack group Y are the same rack group (step S2707).

Here, in a case of being the same rack group (step S2707: Yes), the control device 101 defines a next hop n as the virtual network IP address i (step S2708). In addition, the control device 101 creates a routing table entry (the IP address: e, the netmask: 32, the next hop: n) of the routing table T (step S2709).

On the other hand, in a case of not being the same rack group (step S2707: No), the control device 101 identifies, with reference to the virtual router management table 600, the router collaboration network IP address j of the virtual router R existing in the rack group Y (step S2710). In addition, the control device 101 defines the next hop n as the virtual network IP address j (step S2711), and shifts to the step S2709.

Next, with reference to the virtual machine management table 500, the control device 101 determines whether or not a yet-to-be-selected virtual machine VM coupled to the coupled virtual network exists (step S2712). Here, in a case where the yet-to-be-selected virtual machine VM exists (step S2712: Yes), the control device 101 returns to the step S2704, and selects the yet-to-be-selected virtual machine VM coupled to the coupled virtual network.

On the other hand, in a case where the yet-to-be-selected virtual machine VM does not exist (step S2712: No), the control device 101 determines, with reference to the virtual router management table 600, whether or not a yet-to-be-selected coupled virtual network to which the virtual router R is coupled exists (step S2713). Here, in a case where the yet-to-be-selected coupled virtual network exists (step S2713: Yes), the control device 101 returns to the step S2702, and selects the yet-to-be-selected coupled virtual network to which the virtual router R is coupled.

On the other hand, in a case where the yet-to-be-selected coupled virtual network does not exist (step S2713: No), the control device 101 returns to a step in which the routing table creation processing is called out. From this, it is possible to create the routing table T corresponding to each virtual router R included in the logical router.

(Procedure of Second Control Processing in Control Device 101)

Next, a procedure of second control processing in the control device 101 will be described. The second control processing is control processing in the control device 101, executed in a case of starting (adding) a virtual machine VM.

Figure 28:
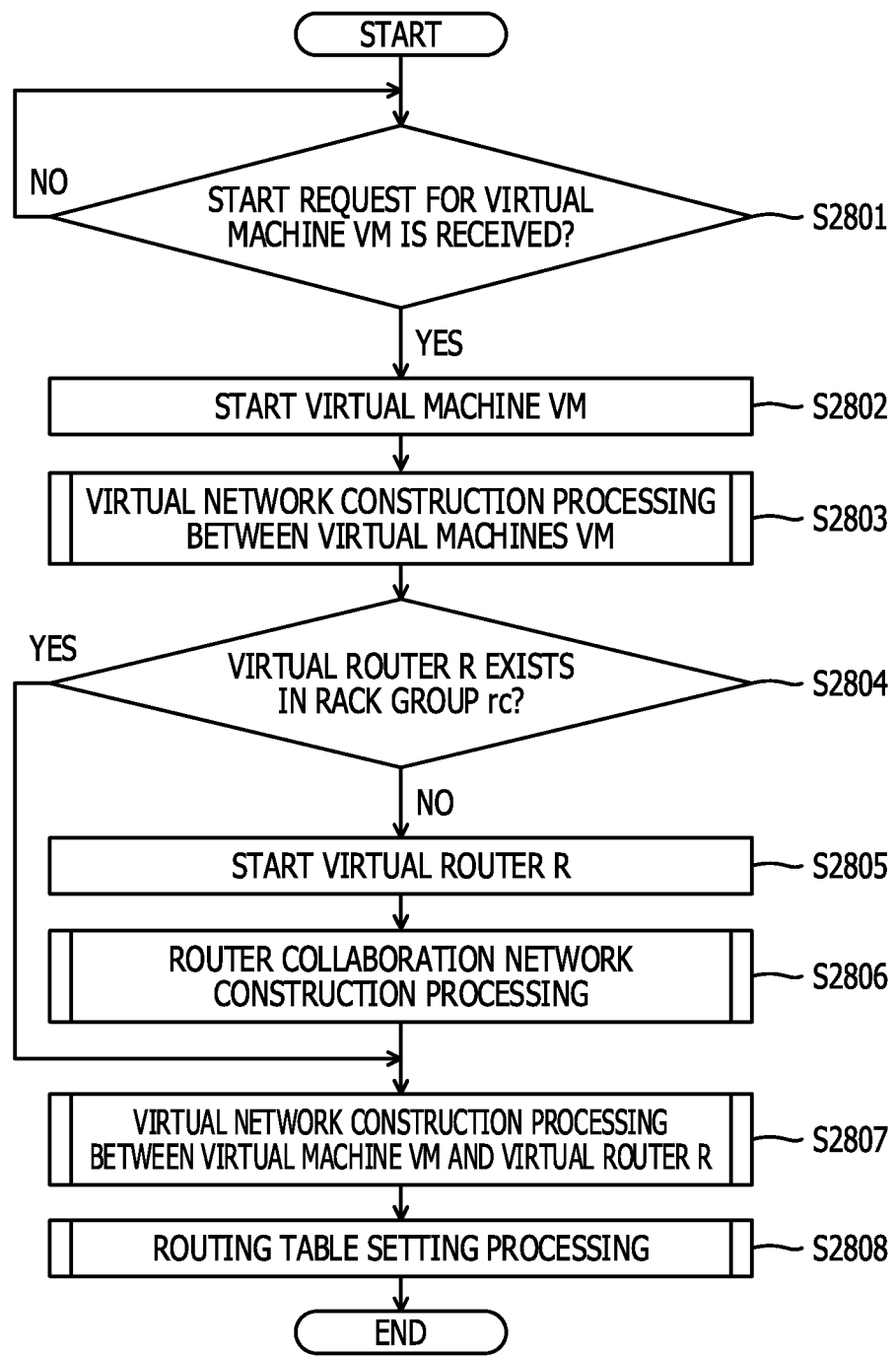
FIG. 28 is a flowchart illustrating an example of a procedure of second control processing in the control device 101.

FIG. 28 is a flowchart illustrating an example of a procedure of the second control processing in the control device 101. In the flowchart in FIG. 28, first, the control device 101 determines whether or not a start request for a virtual machine VM has been received (step S2801). Here, the control device 101 waits for the start request for a virtual machine VM to be received (step S2801: No).

In addition, in a case where the start request for the virtual machine VM has been received (step S2801: Yes), the control device 101 starts the virtual machine VM (step S2802). In addition, the control device 101 executes virtual network construction processing between virtual machines VM (step S2803). A specific processing procedure of the virtual network construction processing between virtual machines VM will be described later using FIG. 29.

Next, with reference to the virtual router management table 600, the control device 101 determines whether or not a virtual router R exists in a rack group rc serving as a start destination (step S2804). Here, in a case where the virtual router R exists (step S2804: Yes), the control device 101 shifts to a step S2807.

On the other hand, in a case where the virtual router R does not exist (step S2804: No), the control device 101 starts a virtual router R in the rack group rc serving as a start destination (step S2805). In addition, the control device 101 executes router collaboration network construction processing (step S2806). Since a specific processing procedure of the router collaboration network construction processing is the same as the processing procedure illustrated in FIG. 24, the description thereof will be omitted.

Next, the control device 101 executes virtual network construction processing between the virtual machine VM and the virtual router R (step S2807). Since a specific processing procedure of the virtual network construction processing between the virtual machine VM and the virtual router R is the same as the processing procedure illustrated in FIG. 25, the description thereof will be omitted.

In addition, the control device 101 executes routing table setting processing for setting the routing table T in the virtual router R (step S2808), and terminates a series of processing operations based on the present flowchart. Since a specific processing procedure of the routing table setting processing is the same as the processing procedure illustrated in FIG. 26, the description thereof will be omitted.

From this, in association with the addition of the virtual machine VM, it is possible to construct or reconstruct the L2 virtual network and the L3 virtual network, and it is possible to set the routing table T in each virtual router R.

<Procedure of Virtual Network Construction Processing Between Virtual Machines VM>

Next, a specific processing procedure of the virtual network construction processing between virtual machines VM in the step S2803 illustrated in FIG. 28 will be described. In the following description, in some cases, a virtual machine VM to serve as a start target is expressed as an "additional machine", and another virtual machine VM different form the additional machine is expressed as an "existing machine".

Figure 29:
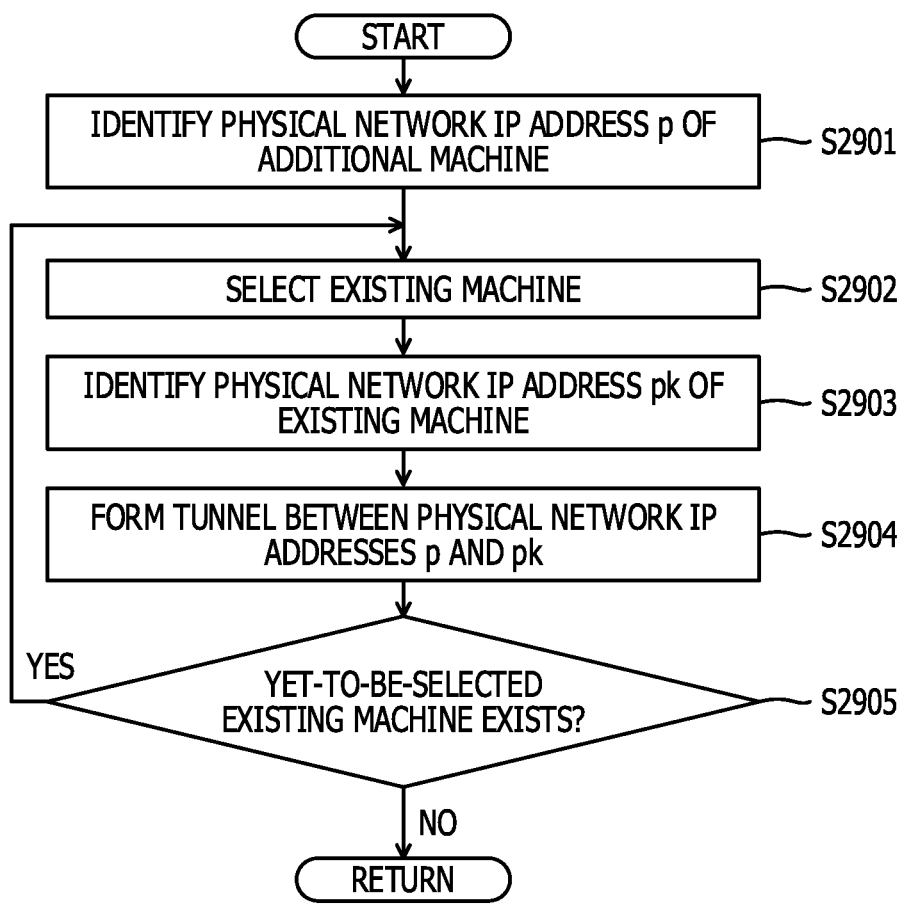
FIG. 29 is a flowchart illustrating an example of a specific processing procedure of virtual network construction processing between virtual machines VM.

FIG. 29 is a flowchart illustrating an example of a specific processing procedure of virtual network construction processing between virtual machines VM. In the flowchart in FIG. 29, first, with reference to the virtual machine management table 500, the control device 101 identifies the physical network IP address p of an additional machine (step S2901).

Next, with reference to the virtual machine management table 500, the control device 101 selects an existing machine (step S2902), and identifies the physical network IP address pk of the existing machine (step S2903). In addition, the control device 101 forms a tunnel between the physical network IP addresses p and pk (step S2904).

Next, with reference to the virtual machine management table 500, the control device 101 determines whether or not a yet-to-be-selected existing machine that is not selected exists (step S2905). Here, in a case where the yet-to-be-selected existing machine exists (step S2905: Yes), the control device 101 returns to the step S2902, and selects the yet-to-be-selected existing machine.

On the other hand, in a case where the yet-to-be-selected existing machine does not exist (step S2905: No), the control device 101 returns to a step in which the virtual network construction processing between the virtual machines VM is called out. From this, in association with the addition of the virtual machine VM, it is possible to reconstruct the L2 virtual network between the virtual machines VM.

(Procedure of Third Control Processing in Control Device 101)

Next, a procedure of third control processing in the control device 101 will be described. The third control processing is control processing in the control device 101, executed in a case of stopping a virtual machine VM.

Figure 30:
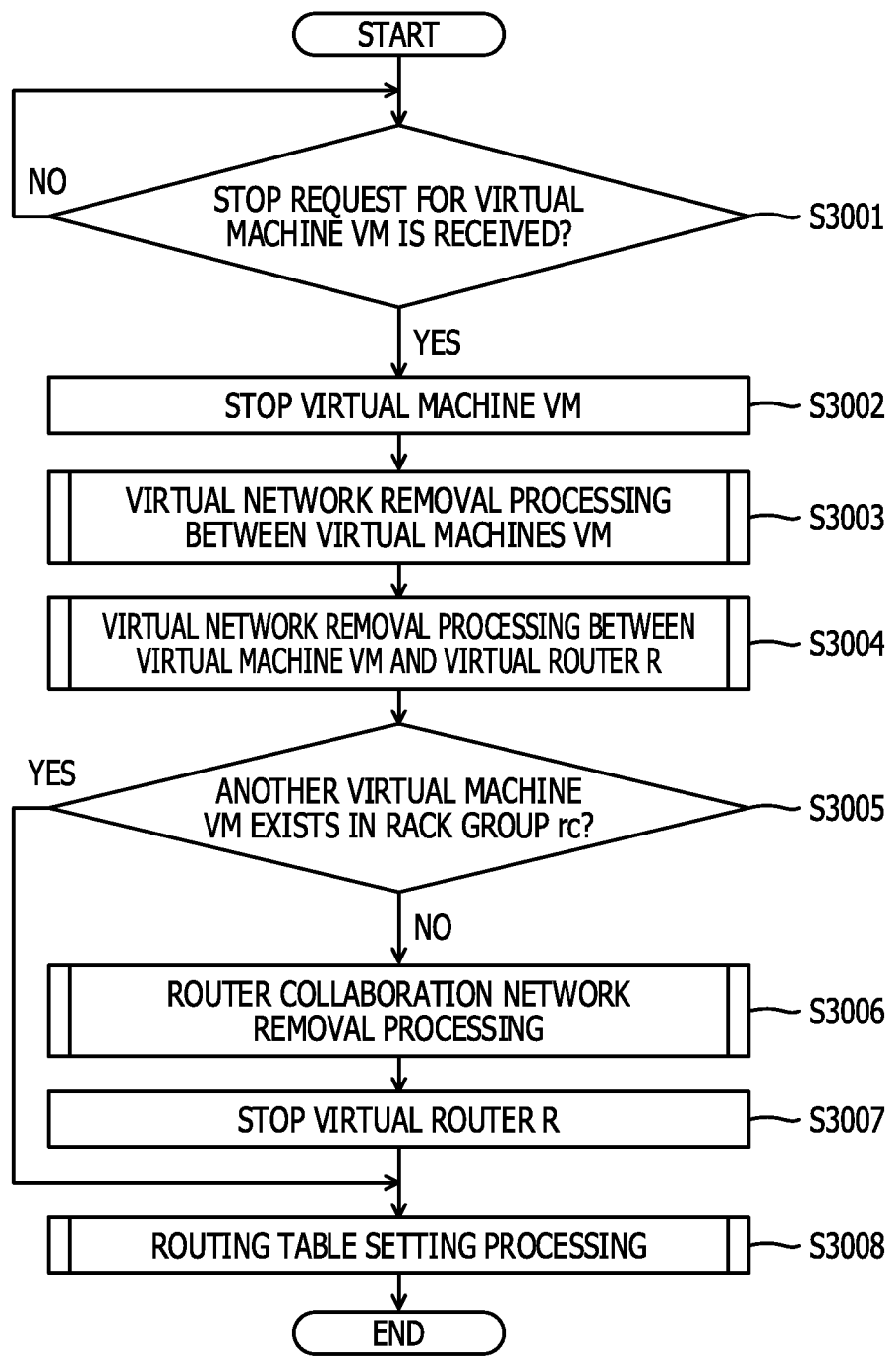
FIG. 30 is a flowchart illustrating an example of a procedure of third control processing in the control device 101.

FIG. 30 is a flowchart illustrating an example of a procedure of the third control processing in the control device 101. In the flowchart in FIG. 30, first, the control device 101 determines whether or not a stop request for a virtual machine VM has been received (step S3001). Here, the control device 101 waits for the stop request for a virtual machine VM to be received (step S3001: No).

In addition, in a case where the stop request for the virtual machine VM has been received (step S3001: Yes), the control device 101 stops the virtual machine VM (step S3002). In addition, the control device 101 executes virtual network removal processing between virtual machines VM (step S3003). A specific processing procedure of the virtual network removal processing between virtual machines VM will be described later using FIG. 31.

Next, the control device 101 executes virtual network removal processing between the virtual machine VM and a virtual router R (step S3004). Since a specific processing procedure of the virtual network removal processing between the virtual machine VM and the virtual router R is the same as the processing procedure illustrated in FIG. 21, the description thereof will be omitted (in this regard, however, the "migration machine" is the virtual machine VM serving as a stop target).

Next, with reference to the virtual machine management table 500, the control device 101 determines whether or not another virtual machine VM different from the virtual machine VM serving as a stop target exists in a rack group rc serving as a stop destination (step S3005). Here, in a case where the other virtual machine VM exists (step S3005: Yes), the control device 101 shifts to a step S3008.

On the other hand, in a case where the other virtual machine VM does not exist (step S3005: No), the control device 101 executes router collaboration network removal processing (step S3006). Since a specific processing procedure of the router collaboration network removal processing is the same as the processing procedure illustrated in FIG. 22, the description thereof will be omitted.

Next, the control device 101 stops a virtual router R of the rack group rc serving as a stop destination (step S3007). In addition, the control device 101 executes routing table setting processing for setting the routing table T in the virtual router R (step S3008), and terminates a series of processing operations based on the present flowchart. Since a specific processing procedure of the routing table setting processing is the same as the processing procedure illustrated in FIG. 26, the description thereof will be omitted.

From this, in association with the stop of the virtual machine VM, it is possible to construct or reconstruct the L2 virtual network and the L3 virtual network, and it is possible to set the routing table T in each virtual router R.

<Procedure of Virtual Network Removal Processing Between Virtual Machines VM>

Next, a specific processing procedure of the virtual network removal processing between virtual machines VM in the step S3003 illustrated in FIG. 30 will be described. In the following description, in some cases, a virtual machine VM to serve as a stop target is expressed as a "removal machine", and another virtual machine VM different form the removal machine is expressed as an "existing machine".

Figure 31:
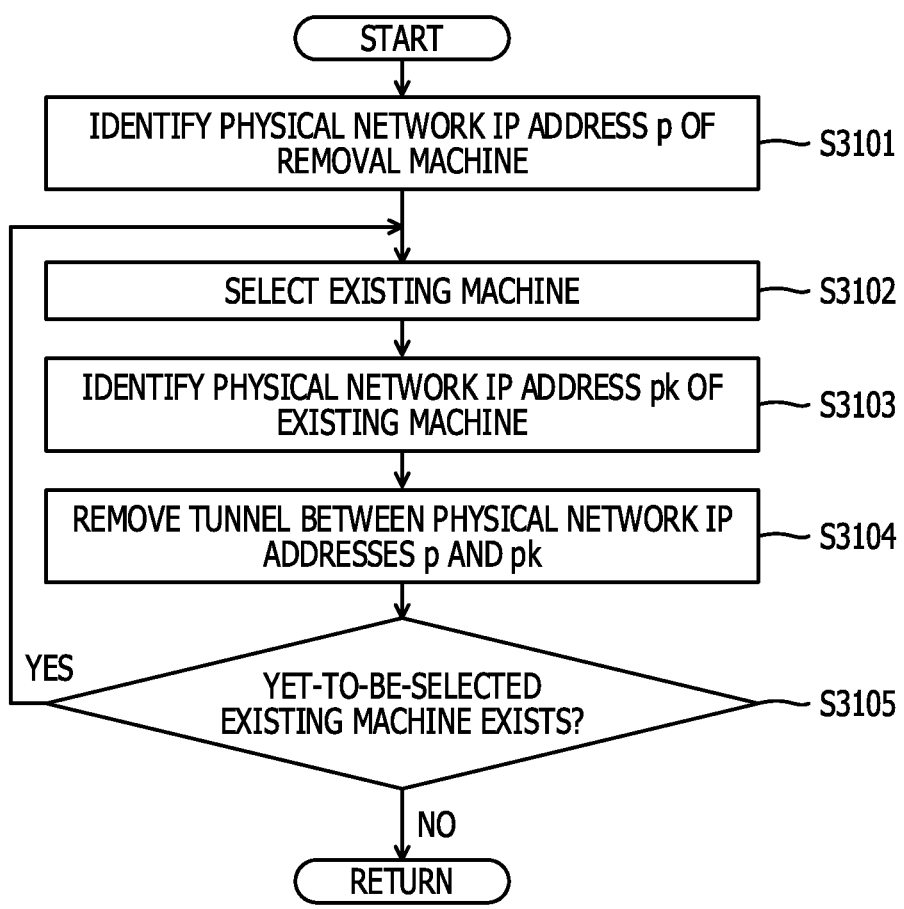
FIG. 31 is a flowchart illustrating an example of a specific processing procedure of virtual network removal processing between virtual machines VM.

FIG. 31 is a flowchart illustrating an example of a specific processing procedure of virtual network removal processing between virtual machines VM. In the flowchart in FIG. 31, first, with reference to the virtual machine management table 500, the control device 101 identifies the physical network IP address p of a removal machine (step S3101).

Next, with reference to the virtual machine management table 500, the control device 101 selects an existing machine (step S3102), and identifies the physical network IP address pk of the existing machine (step S3103). In addition, the control device 101 removes a tunnel between the physical network IP addresses p and pk (step S3104).

Next, with reference to the virtual machine management table 500, the control device 101 determines whether or not a yet-to-be-selected existing machine that is not selected exists (step S3105). Here, in a case where the yet-to-be-selected existing machine exists (step S3105: Yes), the control device 101 returns to the step S3102, and selects the yet-to-be-selected existing machine.

On the other hand, in a case where the yet-to-be-selected existing machine does not exist (step S3105: No), the control device 101 returns to a step in which the virtual network removal processing between the virtual machines VM is called out. From this, in association with the stop of the virtual machine VM, it is possible to reconstruct the L2 virtual network between the virtual machines VM.

As described above, according to the control device 101 according to one of the embodiments, at the time of distributedly arranging a virtual machine VM group in a plurality of rack groups rc, it is possible to start virtual routers R where a same address is set in individual rack groups rc. In addition, according to the control device 101, it is possible to construct the L2 virtual network for coupling the virtual machines VM of the virtual machine VM group to one another and coupling each virtual machine VM and a virtual router R within a rack group rc to each other. In addition, according to the control device 101, it is possible to construct the L3 virtual network for coupling the virtual routers R started in the individual rack groups rc to one another. In addition, according to the control device 101, it is possible to create the routing tables T corresponding to the respective virtual routers R started in the respective rack groups rc, and it is possible to set the routing tables T in the respective virtual routers R. From this, it is possible to easily perform migration of the virtual machine VM associated with changing of the virtual router R serving as a coupling destination, without changing a setting of the virtual machine VM provided to the user, such as an IP address, a routing table, or an Address Resolution Protocol (ARP) table.

In addition, according to the control device 101, in a case where a virtual router R is not started in a rack group rc serving as a migration destination at the time of migrating the virtual machine VM between the rack groups rc, it is possible to start a virtual router R in the rack group rc serving as a migration destination. From this, in association with the migration of a virtual router R beyond a rack group rc, it is possible to provide an additional virtual router R.

In addition, according to the control device 101, in a case where a virtual router R is not started in a rack group rc at the time of starting a new virtual machine VM in the rack group rc, it is possible to start a virtual router R in the rack group rc. From this, in association with the addition of the virtual router R to the virtual system S, it is possible to provide an additional virtual router R.

In addition, according to the control device 101, in a case where, at the time of stopping a virtual machine VM in a rack group rc, another virtual machine VM is not started in the rack group rc, it is possible to stop a virtual router R in the rack group rc. From this, in association with the stop of the virtual router, it is possible to remove the virtual router R to which no virtual machine VM is coupled.

In addition, according to the control device 101, as for the virtual router R started in each rack group rc, it is possible to determine whether or not, with respect to each virtual machine VM in the virtual machine VM group, the virtual machine VM is located in the same rack group as the virtual router R. In addition, according to the control device 101, in a case of being located in the same rack group, it is possible to associate the virtual network IP address of the virtual router R in the L2 virtual network with the virtual network IP address of the virtual machine VM in the L2 virtual network. On the other hand, according to the control device 101, in a case of not being located in the same rack group, it is possible to associate the router collaboration network IP address of another virtual router R in the L3 virtual network with the virtual network IP address of the virtual machine VM in the L2 virtual network, the other virtual router R being located in the same rack group as the virtual machine VM. From this, it is possible to create the routing table T corresponding to the virtual router R started in each rack group rc. In addition, it is possible to control so that each virtual machine VM is able to transmit and receive packets to and from the virtual router R located in the same rack group rc.

From these, according to the control device 101, it becomes possible to easily migrate the virtual machine VM beyond the rack group for convenience on the administrator side, such as resource reallocation or maintenance of the physical machine PM within the data center, and it is possible to facilitate resource management or operation management for the data center. In addition, since routing between virtual machines VM in the same rack group rc is implemented using the virtual router R in the same rack group rc, it is possible to realize the localization of failures and communication.

In addition, by executing a preliminarily prepared program in a computer such as a personal computer or a workstation, it is possible to realize the virtual router control method described in the present embodiment. The present virtual router control program is recorded in a computer-readable recording medium such as a hard disk, a flexible disk, a CD-ROM, an MO, or a DVD, and is read out from the recording medium and executed by the computer. In addition, the present virtual router control program may be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of controlling a virtual router, the method comprising:
    transferring, from a first network to a second network, a first virtual machine included in a plurality of virtual machines which are executed in the first network, the first network including a first virtual router having a first address;
    generating, in the second network, a second virtual router having a same address as the first address;
    constructing, with respect to the plurality of virtual machines arranged in the first network and the second network, a first virtual network that establishes coupling between the plurality of virtual machines including the first virtual machine, coupling between plurality of virtual machines except the first virtual machine and the first virtual router, and coupling between the first virtual machine and the second virtual router;
    constructing a second virtual network that establishes coupling between the first virtual router and the second virtual router;
    creating first and second routing tables corresponding to the first and second virtual routers respectively; and
    setting the first and second routing tables in the first and second virtual routers, respectively, wherein
    the creating of the first routing table includes:
        determining, for each of the plurality of virtual machines, whether the virtual machine is included in the first network,
        when the virtual machine is included in the first network, associating an address of an interface of the first virtual router to the first virtual network with an address of an interface of the virtual machine to the first virtual network, and
        when the virtual machine is not included in the first network, associating the address of the interface of the first virtual router to the first virtual network with an address of an interface of the second virtual router to the second virtual network, and
    the creating of the second routing table includes:
        determining, for each of the plurality of virtual machines, whether the virtual machine is included in the second network,
        when the virtual machine is included in the second network, associating an address of an interface of the second virtual router to the first virtual network with an address of an interface of the virtual machine to the first virtual network, and
        when the virtual machine is not included in the second network, associating the address of the interface of the second virtual router to the first virtual network with an address of an interface of the first virtual router to the second virtual network.

2. The method according to claim 1, wherein the generating generates the second virtual router on the second network in a case where the second virtual router is not generated on the second network when a first virtual machine operating on the first network is migrated to the second network.

3. The method according to claim 1, further comprising:
    stopping the first virtual router in a case where no virtual machine other than a virtual machine serving as a stop target is started on the first network at the time of stopping the virtual machine that serves as a stop target and operates on the first network.

4. The method according to claim 1, wherein the same address is a same IP address and MAC address.

5. The method according to claim 1, wherein
    the first virtual network is a virtual network in a data link layer, and
    the second virtual network is a virtual network in a network layer.

6. The method according to claim 1, further comprising:
    generating the first virtual router in the first network a case where the first virtual router is not generated in the first network at the time of starting one virtual machine of the plural virtual machines in the first network.

7. A non-transitory computer-readable recording medium storing a program that causes a computer to execute a process, the process comprising:
    transferring, from a first network to a second network, a first virtual machine included in a plurality of virtual machines which are executed in the first network, the first network including a first virtual router having a first address;
    generating, in the second network, a second virtual router having a same address as the first address;
    constructing, with respect to the plurality of virtual machines arranged in the first network and the second network, a first virtual network that establishes coupling between the plurality of virtual machines including the first virtual machine, coupling between the plurality of virtual machines except the first virtual machine and the first virtual router, and coupling between the first virtual machine and the second virtual router;
    constructing a second virtual network that establishes coupling between the first virtual router and the second virtual router;
    creating first and second routing tables corresponding to the first and second virtual routers respectively; and
    setting the first and second routing tables in the first and second virtual routers respectively, wherein,
    the creating of the first routing table includes:
        determining, for each of the plurality of virtual machines, whether the virtual machine is included in the first network, when the virtual machine is included in the first network, associating an address of an interface of the first virtual router to the first virtual network with an address of an interface of the virtual machine to the first virtual network, and when the virtual machine is not included in the first network, associating the address of the interface of the first virtual router to the first virtual network with an address of an interface of the second virtual router to the second virtual network, and the creating of the second routing table includes:

determining, for each of the plurality of virtual machines, whether the virtual machine is included in the second network, when the virtual machine is included in the second network, associating an address of an interface of the second virtual router to the first virtual network with an address of an interface of the virtual machine to the first virtual network, and when the virtual machine is not included in the second network, associating the address of the interface of the second virtual router to the first virtual network with an address of an interface of the first virtual router to the second virtual network.

8. A control device comprising:

a memory; and a processor coupled to the memory and configured to:

transfer, from a first network to a second network, a first virtual machine included in a plurality of virtual machines which are executed in the first network, the first network including a first virtual router having a first address;

generate, in the second network a second virtual router having a same address as the first address, construct, with respect to the plurality of virtual machines arranged in the first network and the second network, a first virtual network that establishes coupling between the plurality of virtual machines including the first virtual machine, coupling between the plurality of virtual machines and the first virtual router, and coupling between the first virtual machine and the second virtual router, construct a second virtual network that establishes coupling between the first virtual router and the second virtual router, execute a creating process of first and second routing tables corresponding to the first and second virtual routers respectively, and set the first and second routing tables in the first and second virtual routers respectively, wherein, the creating process of the first routing table includes:

determining, for each of the plurality of virtual machines, whether the virtual machine is included in the first network, when the virtual machine is included in the first network, associating an address of an interface of the first virtual router to the first virtual network with an address of an interface of the virtual machine to the first virtual network, and when the virtual machine is not included in the first network, associating the address of the interface of the first virtual router to the first virtual network with an address of an interface of the second virtual router to the second virtual network, and the creating process of the second routing table includes:

determining, for each of the plurality of virtual machines, whether the virtual machine is included in the second network, when the virtual machine is included in the second network, associating an address of an interface of the second virtual router to the first virtual network with an address of an interface of the virtual machine to the first virtual network, and when the virtual machine is not included in the second network, associating the address of the interface of the second virtual router to the first virtual network with an address of an interface of the first virtual router to the second virtual network.

* * * * *